(12) United States Patent
Miyoshi et al.

(10) Patent No.: US 9,733,660 B2
(45) Date of Patent: Aug. 15, 2017

(54) CONTROL DEVICE FOR IN-VEHICLE SOLAR CELL

(71) Applicant: TOYOTA JIDOSHA KABUSHIKI KAISHA, Toyota-shi (JP)

(72) Inventors: Tatsuya Miyoshi, Toyota (JP); Seigen Maeno, Toyota (JP); Kenichi Okumura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/435,655

(22) PCT Filed: Apr. 22, 2013

(86) PCT No.: PCT/JP2013/061776
§ 371 (c)(1),
(2) Date: Apr. 14, 2015

(87) PCT Pub. No.: WO2014/091777
PCT Pub. Date: Jun. 19, 2014

(65) Prior Publication Data
US 2015/0268687 A1 Sep. 24, 2015

(30) Foreign Application Priority Data

Dec. 13, 2012 (JP) ................................. 2012-272730
Apr. 5, 2013 (JP) ................................. 2013-079580

(51) Int. Cl.
*G06F 7/00* (2006.01)
*G05F 1/67* (2006.01)

(52) U.S. Cl.
CPC ................ *G05F 1/67* (2013.01); *Y02E 10/58* (2013.01)

(58) Field of Classification Search
CPC ......... B60W 2050/0089; B60W 10/18; B60W 50/14; B60W 10/20; B60W 30/06;
(Continued)

(56) References Cited

U.S. PATENT DOCUMENTS 5,218,543 A * 6/1993 Komatsu .................. G07C 1/30
360/5
8,401,779 B2 * 3/2013 Troncoso ................ B60R 16/03
701/123

(Continued)

FOREIGN PATENT DOCUMENTS

| JP | 2002 108466 | 4/2002 |
| JP | 2006 115554 | 4/2006 |

(Continued)

OTHER PUBLICATIONS

International Search Report Issued Jul. 9, 2013 in PCT/JP2013/061776 Filed Apr. 22, 2013.

(Continued)

*Primary Examiner* — Jelani Smith
*Assistant Examiner* — Luis A Martinez Borrero
(74) *Attorney, Agent, or Firm* — Oblon, McClelland, Maier & Neustadt, L.L.P.

(57) ABSTRACT

A control device which performs at least MPPT control of output of a solar cell mounted in a vehicle includes a determination unit that determines whether the vehicle is in a travelling state or a stationary state. Different methods are applied when the vehicle is determined to be in the travelling state and in the stationary state respectively.

9 Claims, 18 Drawing Sheets

(58) Field of Classification Search
CPC ........ B60W 10/10; G06F 17/28; G06F 21/32;
G06F 21/31; G06F 3/016; G06F 8/65;
G06F 3/165; Y02E 10/566; Y02E 10/58;
Y02E 10/563; Y02E 40/72; G05F 1/67;
G05F 1/571; G05F 1/66; B60L 11/1844;
B60L 11/1855; B60L 11/1868
USPC ....... 701/22, 67, 54, 104, 112, 51, 36, 41, 1,
701/70
See application file for complete search history.

(56) References Cited

U.S. PATENT DOCUMENTS

| | | | | |
|---|---|---|---|---|
| 8,421,402 | B2* | 4/2013 | Jang | H01M 10/465 |
| | | | | 320/101 |
| 8,701,800 | B2* | 4/2014 | Hui | B60K 16/00 |
| | | | | 180/2.1 |
| 8,781,708 | B2* | 7/2014 | Wurts | F02D 29/02 |
| | | | | 701/99 |
| 8,805,639 | B1* | 8/2014 | Musicant | G07C 5/08 |
| | | | | 702/1 |
| 9,236,637 | B2* | 1/2016 | Anderson | B60L 8/003 |
| 9,610,848 | B2* | 4/2017 | Okumura | B60L 11/1809 |
| 2003/0104899 | A1* | 6/2003 | Keller | B60K 6/26 |
| | | | | 477/2 |
| 2008/0100258 | A1* | 5/2008 | Ward | H01M 10/465 |
| | | | | 320/101 |
| 2009/0259354 | A1* | 10/2009 | Krupadanam | B60W 10/06 |
| | | | | 701/22 |
| 2011/0118922 | A1* | 5/2011 | Koide | B60K 6/46 |
| | | | | 701/22 |
| 2011/0242857 | A1* | 10/2011 | Kim | H02J 3/385 |
| | | | | 363/21.1 |
| 2012/0043818 | A1* | 2/2012 | Stratakos | H02J 3/383 |
| | | | | 307/77 |
| 2012/0316747 | A1* | 12/2012 | Wurts | F02D 29/02 |
| | | | | 701/99 |
| 2013/0041511 | A1 | 2/2013 | Kohno et al. | |
| 2013/0241448 | A1* | 9/2013 | Yaoi | H01L 31/02008 |
| | | | | 318/139 |
| 2013/0264865 | A1* | 10/2013 | Sugeno | H02J 5/00 |
| | | | | 307/9.1 |
| 2014/0103892 | A1* | 4/2014 | McJimsey | H02J 3/385 |
| | | | | 323/271 |
| 2014/0103894 | A1* | 4/2014 | McJimsey | G05F 1/67 |
| | | | | 323/282 |
| 2014/0214230 | A1* | 7/2014 | Gurudasani | H02J 3/00 |
| | | | | 700/297 |
| 2014/0358342 | A1* | 12/2014 | Marks | B60L 8/003 |
| | | | | 701/22 |
| 2015/0112495 | A1* | 4/2015 | Kim | G05F 1/67 |
| | | | | 700/287 |
| 2015/0134168 | A1* | 5/2015 | Kawakami | B60K 6/485 |
| | | | | 701/22 |
| 2015/0188415 | A1* | 7/2015 | Abido | H02M 3/005 |
| | | | | 307/103 |
| 2016/0075243 | A1* | 3/2016 | Okumura | B60L 8/003 |
| | | | | 318/139 |
| 2016/0181970 | A1* | 6/2016 | Sato | H02S 20/32 |
| | | | | 136/246 |

FOREIGN PATENT DOCUMENTS

| | | |
|---|---|---|
| JP | 2012 181769 | 9/2012 |
| JP | 2012 204651 | 10/2012 |
| WO | 2011 122165 | 10/2011 |

OTHER PUBLICATIONS

Shih-Hung Ko et al., "Photovoltaic dynamic MPPT on a moving vehicle", Solar Energy, Pergamon Press. Oxford, GB, vol. 86, No. 6, Mar. 22, 2012. p. 1750-p. 1760. XP028482860.

* cited by examiner

CONTROL DEVICE FOR IN-VEHICLE SOLAR CELL

TECHNICAL FIELD

The present invention relates to a control device for an in-vehicle solar cell.

BACKGROUND ART

Recently, as renewable energy sources, solar cells that directly convert the light energy of the sun to electric energy (photovoltaic power generation) have been attracting attention. Since the output of solar cells varies depending on the insolation conditions of the sunlight and the like, when the insolation conditions change, there are cases in which it is not possible to efficiently extract electric energy. Therefore, maximum power point tracking (MPPT) control is known in which the optimal operation points are tracking-controlled so that the output of a solar cell is maximized even when the insolation conditions change (for example, Patent Literature 1).

CITATION LIST

Patent Literature

[Patent Literature 1] Japanese Unexamined Patent Application Publication No. 2002-108466
[Patent Literature 2] Pamphlet of International Publication No. WO2011/122165
[Patent Literature 3] Japanese Unexamined Patent Application Publication No. 2006-115554

SUMMARY OF INVENTION

Technical Problem

Solar cells have been used, mainly, in a stationary form so that solar cells are installed on the roofs of houses and the like. In the case of stationary solar cells, even when the insolation conditions change due to the weather, the position of the sun, and the like, the changes are relatively modest. However, in a case in which solar cells are installed in vehicles, during the travelling of vehicles, the insolation conditions rapidly change due to the influence of the shadows of buildings, tunnels, and the like. In order to cope with the above-described changes, shortening of the control cycle of the MPPT control and high-speed tracking control can be considered. However, the shortening of the control cycle leads to an increase in the power consumption of control devices, and thus the power is wastefully consumed when the changes of the insolation conditions are modest. In addition, when the control cycle is shortened, the MPPT control tracks even the short shadows of telegraph poles and the like, and thus, in a case in which vehicles travel at a high speed, the vehicles have already passed through shadows even before the optimal operation points for the shadows have been obtained, and suitable optimal operation points have already changed. Therefore, in spite of the high-speed MPPT control being in place, it is not possible to efficiently extract electric energy, and power is wastefully consumed.

An object of the present invention is to provide a control device for an in-vehicle solar cell which suppresses power consumption and enables the MPPT control that copes with changes in the insolation conditions in vehicles.

Solution to Problem

According to the present invention, there is provided a control device for an in-vehicle solar cell which performs at least MPPT control of output of the solar cell mounted in a vehicle, including a determination unit that determines whether the vehicle is in a travelling state or a stationary state, wherein different control methods are applied when the vehicle is determined by the determination unit to be in the travelling state and in the stationary state respectively.

The solar cell is mounted in the vehicle, and is at least MPPT controlled by the control device. In the control device, the vehicle is determined to be in a travelling state or a stationary state using the determination unit. Examples of the stationary state may include a state in which the vehicle travels at a low speed due to a traffic jam or the like in addition to a state in which the vehicle is parked and a state in which the vehicle has stopped (remain stationary) due to a red light signal. In a case in which the vehicle is in the stationary state, the changes in the insolation conditions are relatively modest. On the other hand, in a case in which the vehicle is in the travelling state, the insolation conditions rapidly change. Therefore, in the control device, different control methods of the MPPT control are respectively applied when the vehicle is determined by the determination unit to be in the travelling state and in the stationary state. As described above, in the control device for the in-vehicle solar cell, different control methods are respectively applied when the determination unit determines that the vehicle is in the travelling state and in the stationary state, and thus it is possible to suppress the power consumption and enable the MPPT control coping with the changes in the insolation conditions in vehicles.

In the control device for the in-vehicle solar cell of the present invention, in a case in which the vehicle is determined by the determination unit to be in the travelling state, a control cycle of the MPPT control is preferably set to be shorter than the control cycle when the vehicle is determined to be in the stationary state.

As described above, the changes in the insolation conditions are relatively modest in a case in which the vehicle is in the stationary state; however, in a case in which the vehicle is in the travelling state, the insolation conditions rapidly change. Therefore, in the control device, in a case in which the vehicle is determined by the determination unit to be in the travelling state, the control cycle of the MTTP control is set to be shorter than the control cycle when the vehicle is determined to be in the stationary state, and the MPPT control is performed at a higher speed. Therefore, even when the insolation conditions rapidly change due to the influence of the shadows of buildings, tunnels, and the like during the travelling of the vehicle, it is possible to tracking-control the optimal operation points at which the output of the solar cell is maximized in accordance with the changes of the insolation conditions. In the control device, in a case in which the vehicle is determined by the determination unit to be in the stationary state, the control cycle of the MPPT control is not shortened, and thus the MPPT control is performed at a low speed (for example, approximately as low as for the MPPT control of stationary solar cells). Therefore, the power consumed in the control device can be reduced. As described above, in the control device for the in-vehicle solar cell, in a case in which the vehicle is in the travelling state, the control cycle of the MPPT control is set to be shorter than the control cycle when the vehicle is in the stationary state, whereby it is possible to shorten the control cycle of the MPPT control only when necessary, and thus the power consumption is suppressed, and the MPPT control coping with the changes in the insolation conditions in vehicles is enabled.

In the control device for the in-vehicle solar cell of the present invention, in a case in which the vehicle is determined by the determination unit to be in the travelling state, when a speed of the vehicle is equal to or more than a predetermined speed, output control of the solar cell is preferably more suppressed than when the speed of the vehicle is less than the predetermined speed.

When the vehicle (particularly, the solar cell mounted in the vehicle) enters a short shadow at a high speed, the vehicle passes through the shadow within an extremely short period of time. In such a case, even when the MPPT control is performed at a high speed, there is a possibility that electric energy cannot be efficiently extracted. Therefore, in the control device, in a case in which the vehicle is determined by the determination unit to be in the travelling state, when the speed of the vehicle is equal to or more than the predetermined speed, the output control of the solar cell is suppressed. Therefore, it is possible to suppress the high-speed MPPT control being wastefully performed when the speed of the vehicle is high, and the power consumed in the control device can be reduced. The predetermined speed is set in consideration of the responsiveness of the solar cell, the processing capacity of the control device, and the like. As described above, in the control device for the in-vehicle solar cell, in a case in which the vehicle is in the travelling state, when the speed of the vehicle is equal to or more than the predetermined speed, the output control of the solar cell is suppressed, whereby it is possible to suppress the wasteful high-speed MPPT control, the power consumption is suppressed, and MPPT control that copes with the changes in the insolation conditions in vehicles is enabled.

In the control device for the in-vehicle solar cell of the present invention, the output control is suppressed by setting the control cycle of the MPPT control to be longer than the control cycle when the speed of the vehicle is less than the predetermined speed of the vehicle or controlling the output of the solar cell at a fixed voltage. When the speed of the vehicle is high, the MPPT control is performed at a low speed by setting the control cycle of the MPPT control to be long. Therefore, even in a case in which the vehicle passes through a short shadow, it is possible to suppress the tracking control of the short shadow. In addition, when the speed of the vehicle is high, the tracking control through the MPPT control is not performed by controlling the output of the solar cell at the fixed voltage. Therefore, even in a case in which the vehicle passes through a short shadow, the short shadow is not tracking-controlled.

In the control device for the in-vehicle solar cell of the present invention, the determination unit determines whether the vehicle is in the travelling state or the stationary state on the basis of state of an ignition switch and/or the speed of the vehicle.

In the control device, the determination unit determines whether the vehicle is in the travelling state or in the stationary state on the basis of only the state of the ignition switch, only the speed of the vehicle, or both the state of the ignition switch and the speed of the vehicle. In a case in which the state of the ignition switch is the OFF state, the vehicle is not in operation (that is, the vehicle is parked), and thus the vehicle can be determined to be in the stationary state. In a case in which the state of the ignition switch is the ON state, the vehicle is in operation, and thus the vehicle can be determined to be in the travelling state. In addition, in a case in which the speed of the vehicle is less than the speed for determining the stationary state, the vehicle can be determined to be in the stationary state, and in a case in which the speed of the vehicle is equal to or more than the stationary state determination speed, the vehicle can be determined to be in the travelling state. The stationary state determination speed is a threshold value for determining the state of a speed at which the vehicle has stopped (a speed when the vehicle is travelling at a low speed due to a traffic jam or the like may be included). Furthermore, it is also possible to determine whether the vehicle is in the travelling state or in the stationary state using a combination of a determination using the state of the ignition switch and a determination using the speed of the vehicle. As described above, in the control device, it is possible to determine whether the vehicle is in the travelling state or in the stationary state using the state of the ignition switch and/or the speed of the vehicle.

In the control device for the in-vehicle solar cell of the present invention, in a case in which the determination unit makes a determination on the basis of the state of the ignition state, the determination unit may determine that the vehicle is in the travelling state when the ignition switch is in the ON state, and may determine that the vehicle is in the stationary state when the ignition switch is in the OFF state. As described above, the control device is capable of simply determining whether the vehicle is in the travelling state or in the stationary state using the state of the ignition switch.

In the control device for the in-vehicle solar cell of the present invention, in a case in which the determination unit makes a determination on the basis of the speed of the vehicle, the determination unit may determine that the vehicle is in the travelling state when the speed of the vehicle is equal to or more than a stationary state determination speed, and may determine that the vehicle is in the stationary state when the speed of the vehicle is less than the stationary state determination speed. As described above, when the speed of the vehicle is used, it is possible for the control device to determine not only a state in which the vehicle is parked but also a state in which the vehicle has stopped (the vehicle travelling at a low speed may be included) as in the stationary state. As a result, it is possible to perform the MPPT control at a low speed for a long period of time, and further suppress the power consumption.

In the control device for the in-vehicle solar cell of the present invention, in a case in which the determination unit makes a determination on the basis of the state of the ignition switch and the speed of the vehicle, the determination unit may determine that the vehicle is in the travelling state when the ignition switch is in the ON state and the speed of the vehicle is equal to or more than a stationary state determination speed, and may determine that the vehicle is in the stationary state when the ignition switch is in the OFF state or when the ignition switch is in the ON state and the speed of the vehicle is less than the stationary state determination speed. As described above, when the state of the ignition switch and the speed of the vehicle are used, the control device is capable of distinctively determining whether the vehicle is parked or stopped in the stationary state.

In the control device for the in-vehicle solar cell of the present invention, in a case in which the ignition switch is in the OFF state, a determination by the determination unit on the basis of the speed of the vehicle is preferably prohibited.

As described above, it is possible to determine that the vehicle is in the stationary state in a case in which the speed of the vehicle is less than the stationary state determination speed, and determine that the vehicle is in the travelling state in a case in which the speed of the vehicle is equal to or more than the stationary state determination speed. In a case in which the state of the ignition switch is the OFF state, the vehicle stays parked, and thus the vehicle can be determined to be in the stationary state without determining the speed. Therefore, in the control device, in a case in which the ignition switch is in the OFF state, a determination by the determination unit on the basis of the speed is prohibited. As a result, while the vehicle stays parked, a determination is not performed on the basis of the speed, and thus the power consumed in the control device can be reduced. As described above, in the control device, in a case in which the ignition switch is in the OFF state, a determination on the basis of the speed is prohibited, and thus it is possible to further suppress the power consumption.

The control device for the in-vehicle solar cell of the present invention may include a plurality of MPPTs having different control cycles and a switching unit that switches a control method to any one of the plurality of MPPTs according to determination results from the determination unit.

The control device for the in-vehicle solar cell of the present invention may include an MPPT having an alterable control cycle and a switching unit that switches the control cycle of the MPPT according to the determination results from the determination unit. In the case of the control device with the above-described constitution, the MPPT is constituted of one unit, and thus it is possible to reduce the mounting space.

Advantageous Effects of Invention

According to the present invention, since different control methods are applied in a case in which the vehicle is in the travelling state, and in a case in which the vehicle is in the stationary state, the power consumption is suppressed, and the MPPT control that copes with the changes in the insolation conditions in vehicles is enabled.

DESCRIPTION OF EMBODIMENTS

Hereinafter, embodiments of a control device for an in-vehicle solar cell according to the present invention will be described with reference to the accompanying drawings. In individual drawings, identical or equivalent components will be given identical reference signs, and description thereof will not be repeated.

In the present embodiment, the control device for an in-vehicle solar cell according to the present invention is applied to a control device for an in-vehicle solar cell system (solar system). In the solar cell system according to the present embodiment, a solar cell panel is mounted in a vehicle, and MPPT control is performed using a control device (ECU) (there is a control device that performs not only MPPT control but also fixed voltage control). In the present embodiment, nine embodiments that are different in terms of the number of MPPTs, parameters used for the switching of the MPPT control (in the case of a control device also performing the fixed voltage control, the MTTP control and the fixed voltage control), and the presence of the fixed voltage control will be described. In a first embodiment, there are two MPPTs and the state of an ignition switch (hereinafter, referred to as the IG switch) is used for switching; in a second embodiment, there is one MPPT and the state of the IG switch is used for switching; in a third embodiment, there are two MPPTs and the speed of a vehicle is used for switching; in a fourth embodiment, there is one MPPT and the speed of the vehicle is used for switching; in a fifth embodiment, there are two MPPTs and the state of the IG switch and the speed of the vehicle are used for switching; in a sixth embodiment, there is one MPPT and the state of the IG switch and the speed of the vehicle are used for switching; in a seventh embodiment, there is one MPPT and the speed of the vehicle is used for switching; and in eighth and ninth embodiments, the fixed voltage control is performed, there is one MPPT, and the speed of the vehicle is used for switching.

In the solar cell system according to the present embodiment, even when the vehicle stays parked (a state in which the vehicle is not in operation), power is extracted by performing the MPPT control, and is charged into a battery. In the present embodiment, a well-known control of the related art is applied as the MPPT control, and a well-known electric circuit of the related art is used. In addition, in the present embodiment, in a case in which the fixed voltage control is also performed, as the fixed voltage control, a well-known control of the related art is applied, and a well-known electric circuit of the related art is used.

Figure 1:
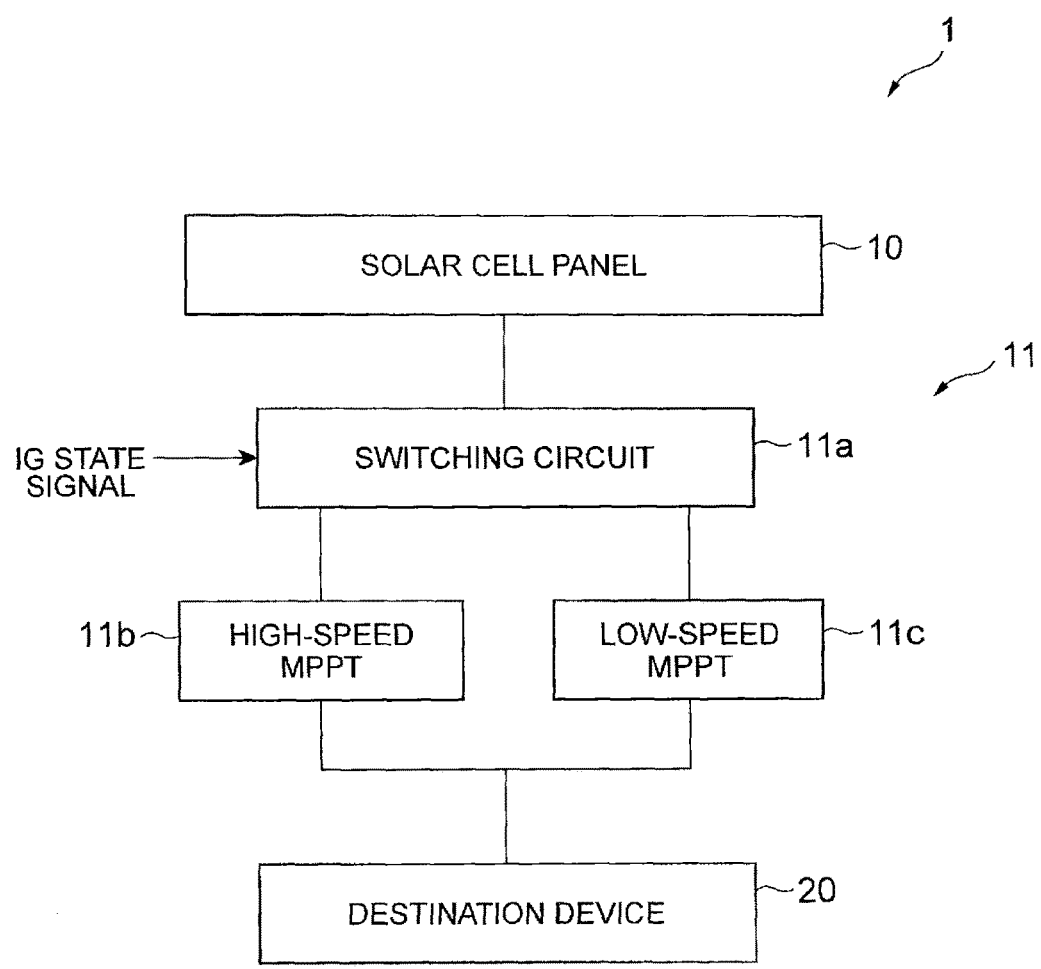
FIG. 1 is a constitutional view of a solar cell system according to a first embodiment.

With reference to FIG. 1, a solar cell system 1 of the first embodiment will be described. FIG. 1 is a constitutional view of the solar cell system according to the first embodiment.

In the solar cell system 1, a solar cell panel 10 is MPPT controlled by a control device 11, and the MPPT-controlled power is output to a destination device 20. Particularly, in the control device 11, it is determined whether the vehicle is travelling or stays parked on the basis of the state of the IG switch, and in a case in which the vehicle is travelling, the MPPT control is performed at a high speed, and in a case in which the vehicle stays parked, the MPPT control is performed at a low speed.

The solar cell panel 10 is a component having a panel-like shape which is constituted by connecting multiple solar cells (cells) in series and parallel so that a voltage and a current necessary for being mounted in vehicles are obtained. As the solar cells (cells), a well-known solar cell of the related art which is suitable for being mounted in vehicles is used. In order to detect the voltage and the current output from the solar cell panel 10, a voltage sensor and a current sensor, which are not illustrated in the drawing, are provided, and voltages and currents are detected every certain period of time. The respective detection values of the voltages and the currents are used for the MPPT control in the control device 11. The control device 11 is connected to the solar cell panel 10.

The control device 11 includes a switching circuit 11a, a high-speed MPPT 11b, and a low-speed MPPT 11c. The solar cell panel 10 and the destination device 20 are connected to the control device 11. In the first embodiment, the switching circuit 11a corresponds to a determination unit and a switching unit described in the claims, and the high-speed MPPT 11b and the low-speed MPPT 11c correspond to a plurality of MPPTs having different control cycles described in the claims.

The switching circuit 11a is an electric circuit for switching between the high-speed MPPT 11b and the low-speed MPPT 11c on the basis of the state of the IG switch. An ignition state signal indicating the state of the IG switch (not illustrated) (hereinafter, referred to as the IG state signal) is input to the switching circuit 11a, and the high-speed MPPT 11b and the low-speed MPPT 11c are connected to the switching circuit. In the switching circuit 11a, it is determined whether the IG state signal is in the ON state or in the OFF state. In addition, in the switching circuit 11a, in a case in which the IG state signal is determined to be in the ON state, the high-speed MPPT 11b is operated (the high-speed MPPT 11b is used), and in a case in which the IG state signal is determined to be in the OFF state, the low-speed MPPT 11c is operated (the low-speed MPPT 11c is used).

In a case in which the IG state signal is in the ON state, the vehicle can be determined to be travelling (the vehicle is in the operation state), and a high-speed tracking control is required as the MPPT control. That is, when the vehicle is travelling, there are cases in which the rapid travelling of the vehicle into and out of the shadow of buildings, tunnels, and the like leads to rapid changes in the insolation conditions (as the speed of the vehicle increases, the changes become faster), and thus it is necessary to perform the MPPT control at a high speed in order to cope with the changes. On the other hand, in a case in which the IG state signal is in the OFF state, the vehicle can be determined to remain parked (the vehicle is not in the operation state), and the MPPT control may be a low-speed tracking control. That is, when the vehicle stays parked, the insolation conditions change due to the weather, the position of the sun, and the like, but the changes are relatively modest, and thus the MPPT control may be performed at a low speed to cope with the changes (for example, the control speed may be approximately as low as the control speed of the MPPT control of stationary solar cells).

The high-speed MPPT 11b is an electric circuit that performs the MPPT control with short control cycles (with a high-speed tracking control). The low-speed MPPT 11c is an electric circuit that performs the MPPT control with long control cycles (with a low-speed tracking control). The high-speed MPPT 11b and the low-speed MPPT 11c are both electric circuits for performing a well-known MPPT control of the related art, and are different only in terms of the control cycle. The control cycle of the low-speed MPPT 11c is approximately the control cycle of the MPPT control for stationary solar cells, and is, for example, in a range of several tens of seconds to several minutes. The control cycle of the high-speed MPPT 11b is a control cycle that is shorter than the control cycle of the low-speed MPPT 11c, and is, for example, in a range of several milliseconds to several seconds. In a case in which the control cycle of the high-speed MPPT 11b is set, the standard speed of the vehicle is determined, and the control cycle is set in accordance with the speed.

In the MPPT control carried out using the high-speed MPPT 11b and the low-speed MPPT 11c, the optimal operation points (the optimal power=voltage×current) at which the output is maximized are obtained according to a well-known algorithm on the basis of the actual power value obtained from the respective detection values of the voltage and current that are output from the solar cell panel 10 every control cycle, and feedback control is performed using the voltages at the optical operation points as target values. Through the above-described control, every control cycle, the voltage output from the solar cell panel 10 serves as the voltage at the optimal operation point, and the maximum power that can be obtained under the insolation conditions at this time is output.

The destination device 20 is a device that serves as the destination of the power that is MPPT-controlled in the control device 11. Examples of the destination device 20 include a variety of loads mounted in vehicles which are operated using the power, converters that convert the power to a predetermined power, and batteries that store the power.

Figure 2:
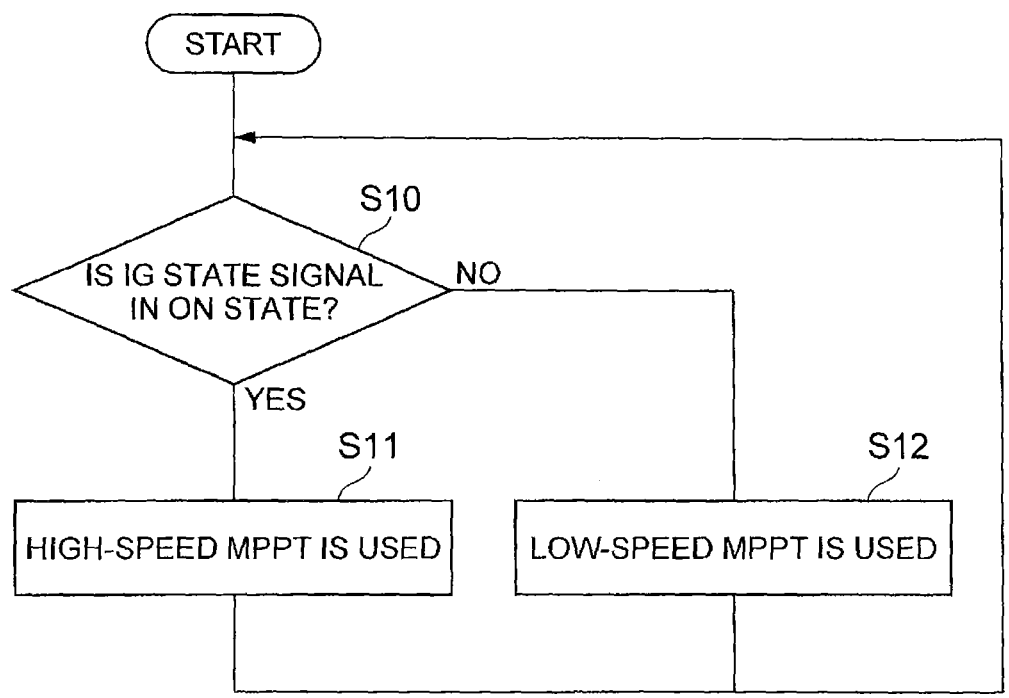
FIG. 2 is a control flowchart according to the first embodiment.

The operation of the solar cell system 1 having the above-described constitution will be described using the flowchart of FIG. 2. FIG. 2 is a control flowchart according to the first embodiment.

In the switching circuit 11a, it is determined whether or not the IG state signal is in the ON state (S10). In a case in which the IG state signal is determined to be in the ON state in S10 (in a case in which the vehicle is determined to be travelling), in the switching circuit 11a, the high-speed MPPT 11b is operated in order to use the high-speed MPPT 11b (S11). In the high-speed MPPT 11b, the optimal operation points of the solar cell panel 10 in accordance with the current insolation conditions are obtained in the set short control cycles, and feedback control is performed on the solar cell panel 10 so that the optimal operation points are obtained. On the other hand, in a case in which the IG state signal is determined to be in the OFF state in S10 (in a case in which the vehicle is determined to stay parked), in the switching circuit 11a, the low-speed MPPT 11c is operated in order to use the low-speed MPPT 11c (S12). In the low-speed MPPT 11c, the optimal operation points of the solar cell panel 10 in accordance with the current insolation conditions are obtained in the set long control cycles, and feedback control is performed on the solar cell panel 10 so that the optimal operation points are obtained. The power that is MPPT-controlled every control cycle described above is output to the destination device 20. When the MPPT control is finished in S11 or S12, the process returns to the determination of S10.

According to the control device 11, it is determined whether the vehicle is travelling or stays parked on the basis of the state of the IG switch, and in a case in which the vehicle is determined to be travelling, the control cycle of the MPPT control is set to be shorter than the control cycle when the vehicle is parked, whereby it is possible to set the control cycle of the MPPT control to be short (to increase the speed) only when necessary. As a result, the power consumption is suppressed, and the MPPT control that copes with the changes in the insolation conditions in vehicles is enabled. In a case in which the vehicle is determined to be travelling, even when the insolation conditions rapidly change, it is possible to obtain the optimal operation points in accordance with the rapid changes using the high-speed MPPT control, and the power generated in the solar cell panel 10 can be used as much as possible. On the other hand, in a case in which the vehicle is determined to stay parked, the low-speed MPPT control is performed, and thus the power consumption of the control device 11 can be reduced.

Figure 3:
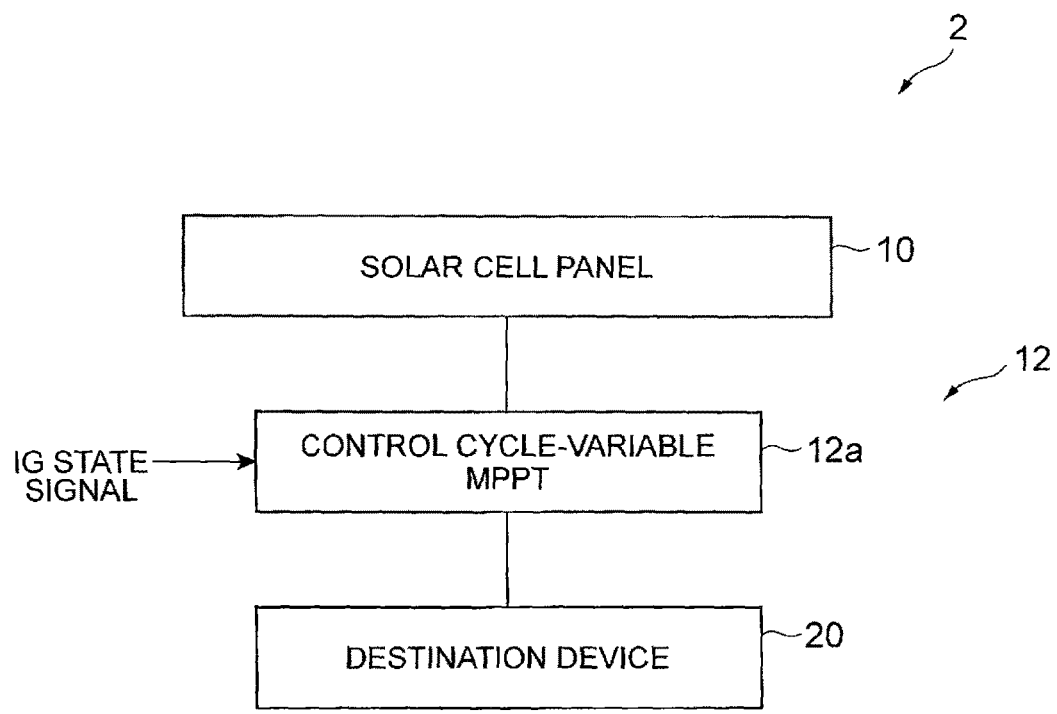
FIG. 3 is a constitutional view of a solar cell system according to a second embodiment.

With reference to FIG. 3, a solar cell system 2 of the second embodiment will be described. FIG. 3 is a constitutional view of the solar cell system according to the second embodiment.

When the solar cell system 2 is compared with the solar cell system 1 according to the first embodiment, a difference lies in the fact that the MPPT is constituted of one unit. Therefore, the control device 12 is configured to have a control cycle-variable MPPT 12a. The solar cell panel 10 and the destination device 20 are connected to the control device 12. In the second embodiment, processing in the control cycle-variable MPPT 12a corresponds to the determination unit and the switching unit described in the claims, and an electric circuit in the control cycle-variable MPPT 12a corresponds to an MPPT having an alterable control cycle described in the claims.

The control cycle-variable MPPT 12a is configured to have a processing unit that switches the control cycle of the MPPT on the basis of the state of the IG switch and an electric circuit that performs the MPPT control with variable control cycles. The processing unit is configured to have a microcomputer and the like into which a predetermined program is incorporated. The IG state signal is input to the processing unit, and the electric circuit that performs the MPPT control is connected to the processing unit. In the processing unit, it is determined whether the IG state signal is in the ON state or in the OFF state. In addition, in the processing unit, in a case in which the IG state signal is determined to be in the ON state, the control cycle of an MPPT control circuit is switched to a high-speed control cycle, and in a case in which the IG state signal is determined to be in the OFF state, the control cycle of the MPPT control circuit is switched to a low-speed control cycle. The MPPT control circuit is an electric circuit for performing a well-known MPPT control of the related art, and has a variable control cycle. In the MPPT control circuit, the MPPT control is performed with the control cycles switched using the processing unit. The low-speed control cycle is the same control cycle as the control cycle of the low-speed MPPT 11c according to the first embodiment. The high-speed control cycle is the same control cycle as the control cycle of the high-speed MPPT 11b according to the first embodiment.

Figure 4:
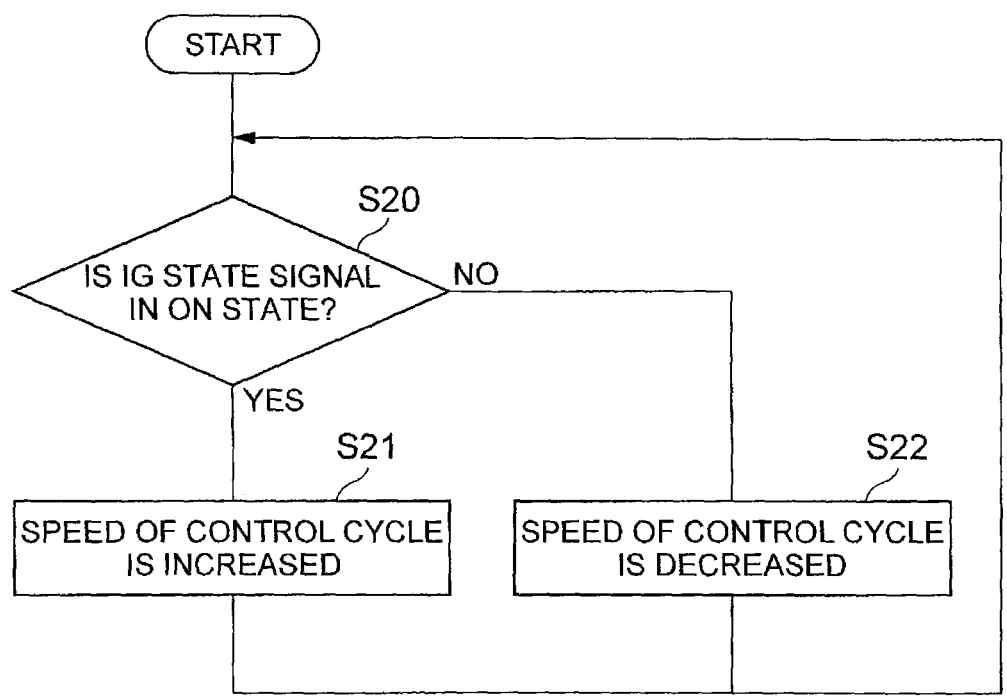
FIG. 4 is a control flowchart according to the second embodiment.

The operation of the solar cell system 2 having the above-described constitution will be described using the flowchart of FIG. 4. FIG. 4 is a control flowchart according to the second embodiment.

In the control cycle-variable MPPT 12a, it is determined whether or not the IG state signal is in the ON state (S20). In a case in which the IG state signal is determined to be in the ON state in S20 (in a case in which the vehicle is determined to be travelling), in the control cycle-variable MPPT 12a, the control cycle is set to be short in order to speed up the control cycle of the MPPT control circuit (S21). In the MPPT control circuit of the control cycle-variable MPPT 12a, the optimal operation points of the solar cell panel 10 in accordance with the current insolation conditions are obtained with short control cycles, and feedback control is performed on the solar cell panel 10 so that the optimal operation points are obtained. On the other hand, in a case in which the IG state signal is determined to be in the OFF state in S20 (in a case in which the vehicle is determined to stay parked), in the control cycle-variable MPPT 12a, the control cycle is set to be long in order to decrease the speed of the control cycle of the MPPT control circuit (S22). In the MPPT control circuit of the control cycle-variable MPPT 12a, the optimal operation points of the solar cell panel 10 in accordance with the current insolation conditions are obtained with long control cycles, and feedback control is performed on the solar cell panel 10 so that the optimal operation points are obtained. The power that is MPPT-controlled every control cycle described above is output to the destination device 20. When the MPPT control is finished in S21 or S22, the process returns to the determination of S20.

The control device 12 has the same effects as the control device 11 according to the first embodiment, and also has the following effect. According to the control device 12, the MPPT is configured to have one unit of the control cycle-variable MPPT 12a, and thus it is possible to reduce the mounting space.

Figure 5:
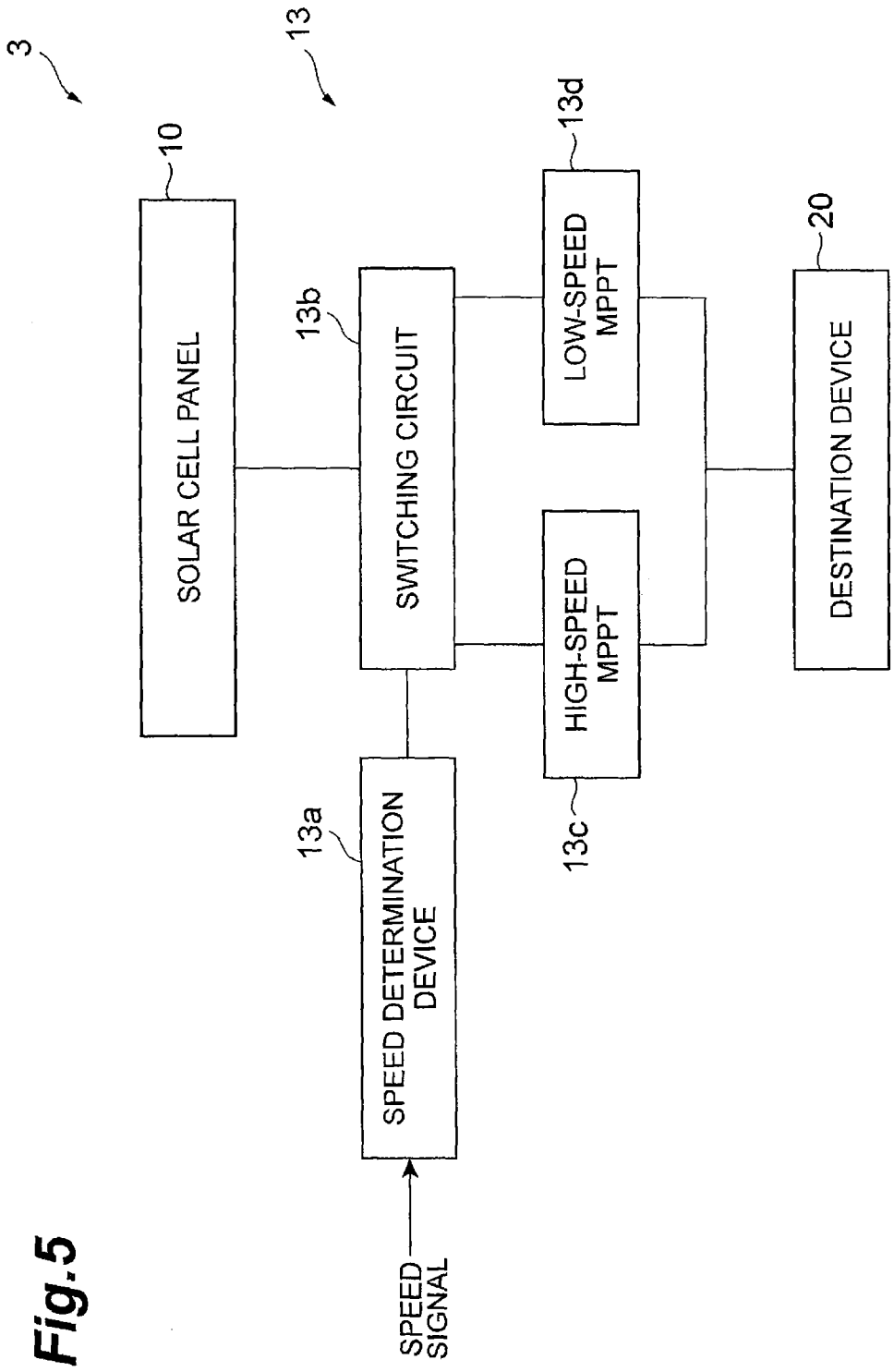
FIG. 5 is a constitutional view of a solar cell system according to a third embodiment.

With reference to FIG. 5, a solar cell system 3 of the third embodiment will be described. FIG. 5 is a constitutional view of the solar cell system according to the third embodiment.

In the solar cell system 3, the solar cell panel 10 is MPPT-controlled using a control device 13, and the MPPT-controlled power is output to the destination device 20. Particularly, in the control device 13, it is determined whether the vehicle is travelling, remains parked or stationary (including the vehicle travelling at a very low speed) on the basis of the speed of the vehicle, and in a case in which the vehicle is travelling, the MPPT control is performed at a high speed, and in a case in which the vehicle remains parked or stationary, the MPPT control is performed at a low speed.

The control device 13 includes a speed determination device 13a, a switching circuit 13b, a high-speed MPPT 13c, and a low-speed MPPT 13d. The solar cell panel 10 and the destination device 20 are connected to the control device 13. In the third embodiment, the speed determination device 13a and the switching circuit 13b correspond to the determination unit described in the claims, the switching circuit 13b corresponds to the switching unit described in the claims, and the high-speed MPPT 13c and the low-speed MPPT 13d correspond to the plurality of MPPTs having different control cycles described in the claims. Since the high-speed MPPT 13c and the low-speed MPPT 13d are the same as the high-speed MPPT 11b and the low-speed MPPT 11c according to the first embodiment, description thereof will not be repeated.

The speed determination device 13a is an electric circuit for determining whether the vehicle is travelling, remains parked, or stationary on the basis of the speed of the vehicle. A speed signal indicating the speed of the vehicle detected using a vehicle speed sensor (not illustrated) is input to the speed determination device 13a, and the switching circuit 13b is connected to the speed determination device. In the speed determination device 13a, it is determined whether or not the speed indicated using the speed signal is equal to or more than 10 km/h. The speed of 10 km/h is a threshold value for determining whether the vehicle is travelling, remains parked or stationary (including not only the vehicle remaining stationary due to a red light signal but also the vehicle travelling at a very low speed due to a traffic jam or the like). In the speed determination device 13a, in a case in which the speed is determined to be equal to or more than 10 km/h, the vehicle is determined to be travelling, and in a case in which the speed is determined to be less than 10 km/h, the vehicle is determined to remain parked or stationary. In addition, in the speed determination device 13a, determination result signals indicating the determination results (the vehicle is travelling, remains parked or stationary) are output to the switching circuit 13b.

In a case in which the speed is equal to or more than 10 km/h, the vehicle can be determined to be travelling, and a high-speed tracking control is required as the MPPT control. That is, when the vehicle is travelling at 10 km/h or more, there are cases in which the rapid travelling of the vehicle into and out of the shadows of buildings, tunnels, and the like at a speed of 10 km/h or more leads to rapid changes in the insolation conditions (as the speed of the vehicle increases, the changes become faster), and thus it is necessary to perform the MPPT control at a high speed in order to cope with the changes. On the other hand, in a case in which the speed is less than 10 km/h, the vehicle can be determined to remain parked or stationary (including the vehicle travelling at a very low speed as well), the MPPT control may be a low-speed tracking control. That is, in a case in which the vehicle remains parked or stationary, the insolation conditions change due to the weather, the position of the sun, and the like, but the changes are relatively modest, and thus the MPPT control may be performed at a low speed to cope with the changes. In a case in which the vehicle is travelling at a very low speed due to a traffic jam or the like, there are cases in which the vehicle travels into and out of the shadows of buildings, tunnels, and the like, but the vehicles slowly travel into and out of them, and there is no case in which the insolation conditions rapidly change.

The switching circuit 13b is an electric circuit for switching between the high-speed MPPT 13c and the low-speed MPPT 13d on the basis of the determination results (the vehicle is travelling, remains parked or stationary) by the speed determination device 13a. A determination result signal output from the speed determination device 13a is input to the switching circuit 13b, and the high-speed MPPT 13c and the low-speed MPPT 13d are connected to the switching circuit. In the switching circuit 13b, it is determined whether the vehicle is travelling, remains parked or stationary on the basis of the determination result signals. Then, in the switching circuit 13b, in a case in which the vehicle is determined to be travelling, the high-speed MPPT 13c is operated, and in a case in which the vehicle is determined to remain parked or stationary, the low-speed MPPT 13d is operated.

Figure 6:
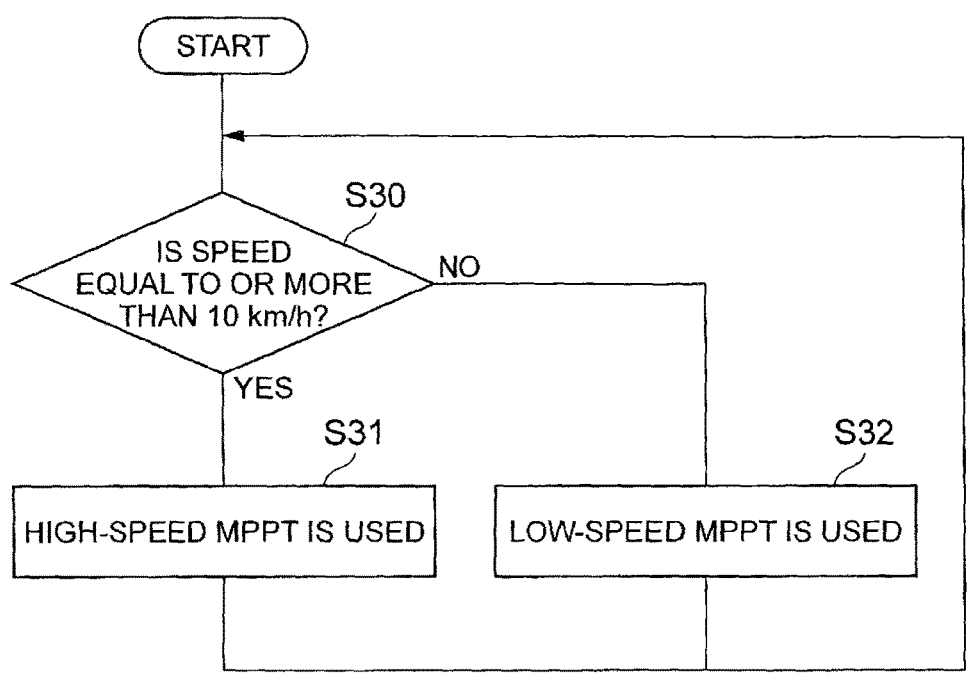
FIG. 6 is a control flowchart according to the third embodiment.

The operation of the solar cell system 3 having the above-described constitution will be described using the flowchart of FIG. 6. FIG. 6 is a control flowchart according to the third embodiment.

In the speed determination device 13a, it is determined whether or not the speed indicated using the speed signal is equal to or more than 10 km/h (S30). In a case in which the speed is equal to or more than 10 km/h in S30, in the speed determination device 13a, the vehicle is determined to be travelling, and a determination result signal indicating the vehicle travelling is output to the switching circuit 13b. In the switching circuit 13b, on the basis of the determination result signal indicating the vehicle travelling, the high-speed MPPT 13c is operated in order to use the high-speed MPPT 13c (S31). In the high-speed MPPT 13c, the same operation as the operation of the high-speed MPPT 11b according to the first embodiment is performed. On the other hand, in a case in which the speed is less than 10 km/h in S30, in the speed determination device 13a, the vehicle is determined to remain parked or stationary, and a determination result signal indicating the vehicle remaining parked or stationary is output to the switching circuit 13b. In the switching circuit 13b, on the basis of the determination result signal indicating the vehicle remaining parked or stationary, the low-speed MPPT 13d is operated in order to use the low-speed MPPT 13d (S32). In the low-speed MPPT 13d, the same operation as the operation of the low-speed MPPT 11c according to the first embodiment is performed. The power that is MPPT-controlled every control cycle described above is output to the destination device 20. When the MPPT control is finished in S31 or S32, the process returns to the determination of S30.

According to the control device 13, it is determined whether the vehicle is travelling, remains parked or stationary on the basis of the speed of the vehicle, and in a case in which the vehicle is travelling, the control cycle of the MPPT control is set to be shorter than the control cycle when the vehicle remains parked or stationary, whereby it is possible to set the control cycle of the MPPT control to be short only when necessary. As a result, the power consumption is suppressed, and the MPPT control that copes with the changes in the insolation conditions in vehicles is enabled. Particularly, in the control device 13, a determination is made using the speed of the vehicle, and thus it is possible to select not only the vehicle being parked but also the vehicle remaining stationary or travelling at a very low speed as the case in which the changes of the insolation conditions are modest. As a result, in the control device 13, it is possible to set the period of time in which the low-speed MPPT control is used to be long, and the power consumption can be further reduced.

Figure 7:
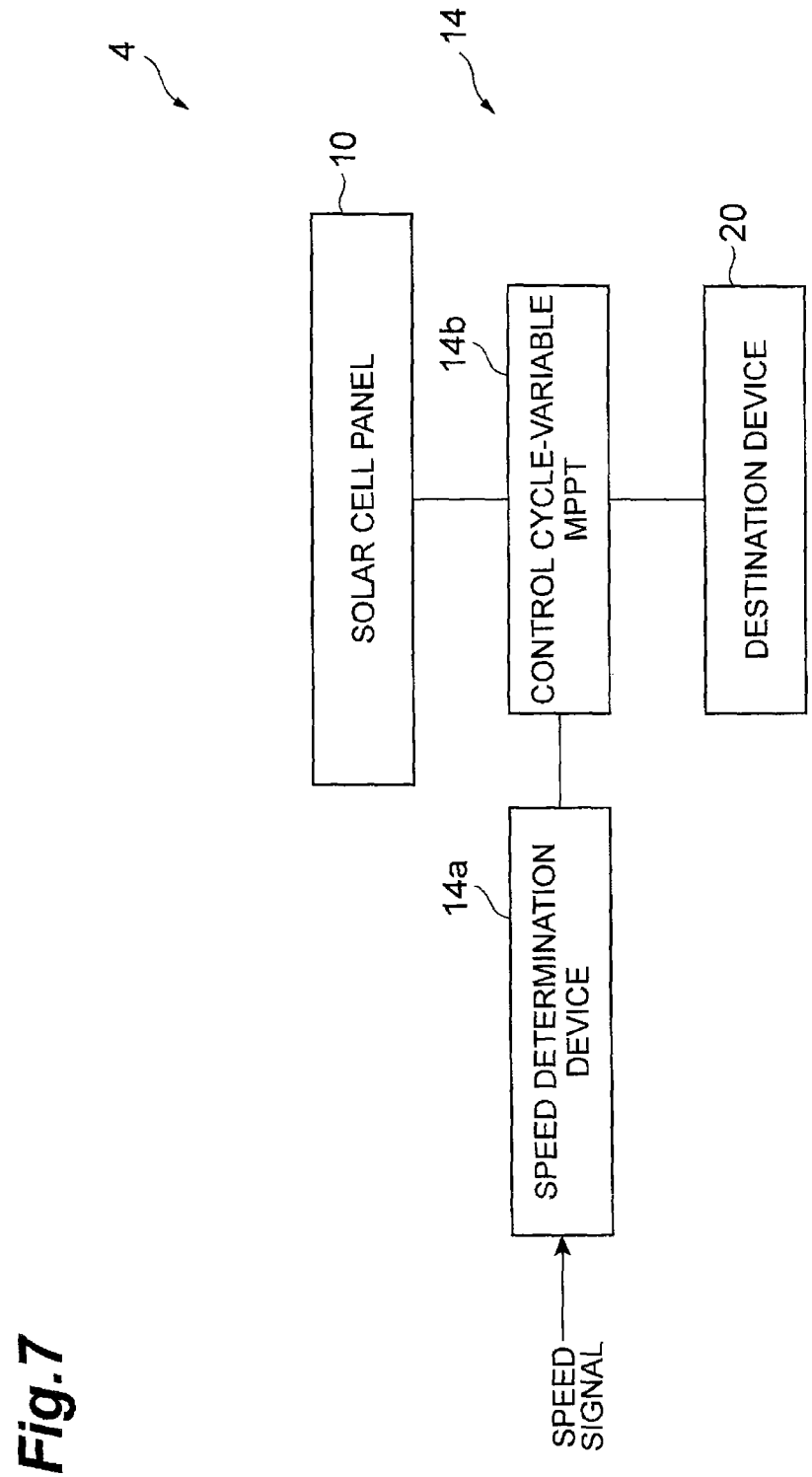
FIG. 7 is a constitutional view of a solar cell system according to a fourth embodiment.

With reference to FIG. 7, a solar cell system 4 of the fourth embodiment will be described. FIG. 7 is a constitutional view of the solar cell system according to the fourth embodiment.

When the solar cell system 4 is compared with the solar cell system 3 according to the third embodiment, a difference lies in the fact that the MPPT is constituted of one unit. Therefore, a control device 14 is configured to have a speed determination device 14a and a control cycle-variable MPPT 14b. The solar cell panel 10 and the destination device 20 are connected to the control device 14. In the fourth embodiment, processing in the speed determination device 14a and the control cycle-variable MPPT 14b corresponds to the determination unit described in the claims, processing in the control cycle-variable MPPT 14b corresponds to the switching unit described in the claims, and an electric circuit in the control cycle-variable MPPT 14b corresponds to an MPPT having an alterable control cycle described in the claims. Since the speed determination device 14a is the same as the speed determination device 13a according to the third embodiment, description thereof will not be repeated.

The control cycle-variable MPPT 14b is configured to have a processing unit that switches the control cycle of the MPPT on the basis of the determination results (the vehicle is travelling, remains parked or stationary) by the speed determination device 14a and an electric circuit that performs the MPPT control with variable control cycles. The processing unit is configured to have a microcomputer and the like into which a predetermined program is incorporated. A determination result signal output from the speed determination device 14a is input to the processing unit, and the electric circuit that performs the MPPT control is connected to the processing unit. In the processing unit, it is determined whether the vehicle is travelling, remains parked or stationary on the basis of the determination result signals. In addition, in the processing unit, in a case in which the vehicle is determined to be travelling, the control cycle of the MPPT control circuit is switched to the high-speed control cycle, and in a case in which the vehicle is determined to remain parked or stationary, the control cycle of the MPPT control circuit is switched to the low-speed control cycle. The MPPT control circuit is the same circuit as the MPPT control circuit in the control cycle-variable MPPT 12a according to the second embodiment.

Figure 8:
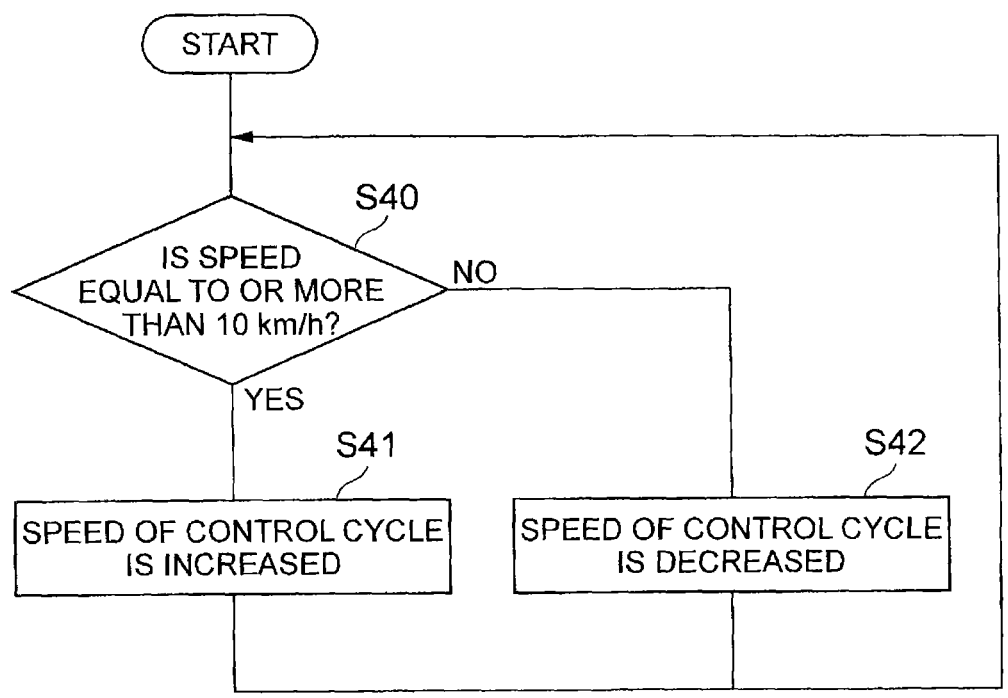
FIG. 8 is a control flowchart according to the fourth embodiment.

The operation of the solar cell system 4 having the above-described constitution will be described using the flowchart of FIG. 8. FIG. 8 is a control flowchart according to the fourth embodiment.

In the speed determination device 14a, it is determined whether or not the speed indicated using the speed signal is equal to or more than 10 km/h (S40). In a case in which the speed is equal to or more than 10 km/h in S40, in the speed determination device 14a, the vehicle is determined to be travelling, and a determination result signal indicating the vehicle travelling is output to the control cycle-variable MPPT 14b. In the control cycle-variable MPPT 14b, on the basis of the determination result signal indicating the vehicle travelling, the control cycle is set to be short in order to speed up the control cycle of the MPPT control circuit (S41). In the MPPT control circuit in the control cycle-variable MPPT 14b, the same operation as the operation of the MPPT control circuit in the control cycle-variable MPPT 12a according to the second embodiment is performed with short control cycles. On the other hand, in a case in which the speed is less than 10 km/h in S40, in the speed determination device 14a, the vehicle is determined to remain parked or stationary, and a determination result signal indicating the vehicle remaining parked or stationary is output to the control cycle-variable MPPT 14b. In the control cycle-variable MPPT 14b, on the basis of the determination result signal indicating the vehicle remaining parked or stationary, the control cycle is set to be long in order to slow down the control cycle of the MPPT control circuit (S42). In the MPPT control circuit in the control cycle-variable MPPT 14b, the same operation as the operation of the MPPT control circuit in the control cycle-variable MPPT 12a according to the second embodiment is performed with long control cycles. The power that is MPPT-controlled every control cycle described above is output to the destination device 20. When the MPPT control is finished in S41 or S42, the process returns to the determination of S40.

The control device 14 has the same effects as the control device 13 according to the third embodiment, and also has the following effect. According to the control device 14, the MPPT is configured to have one unit of the control cycle-variable MPPT 14b, and thus it is possible to reduce the mounting space.

Figure 9:
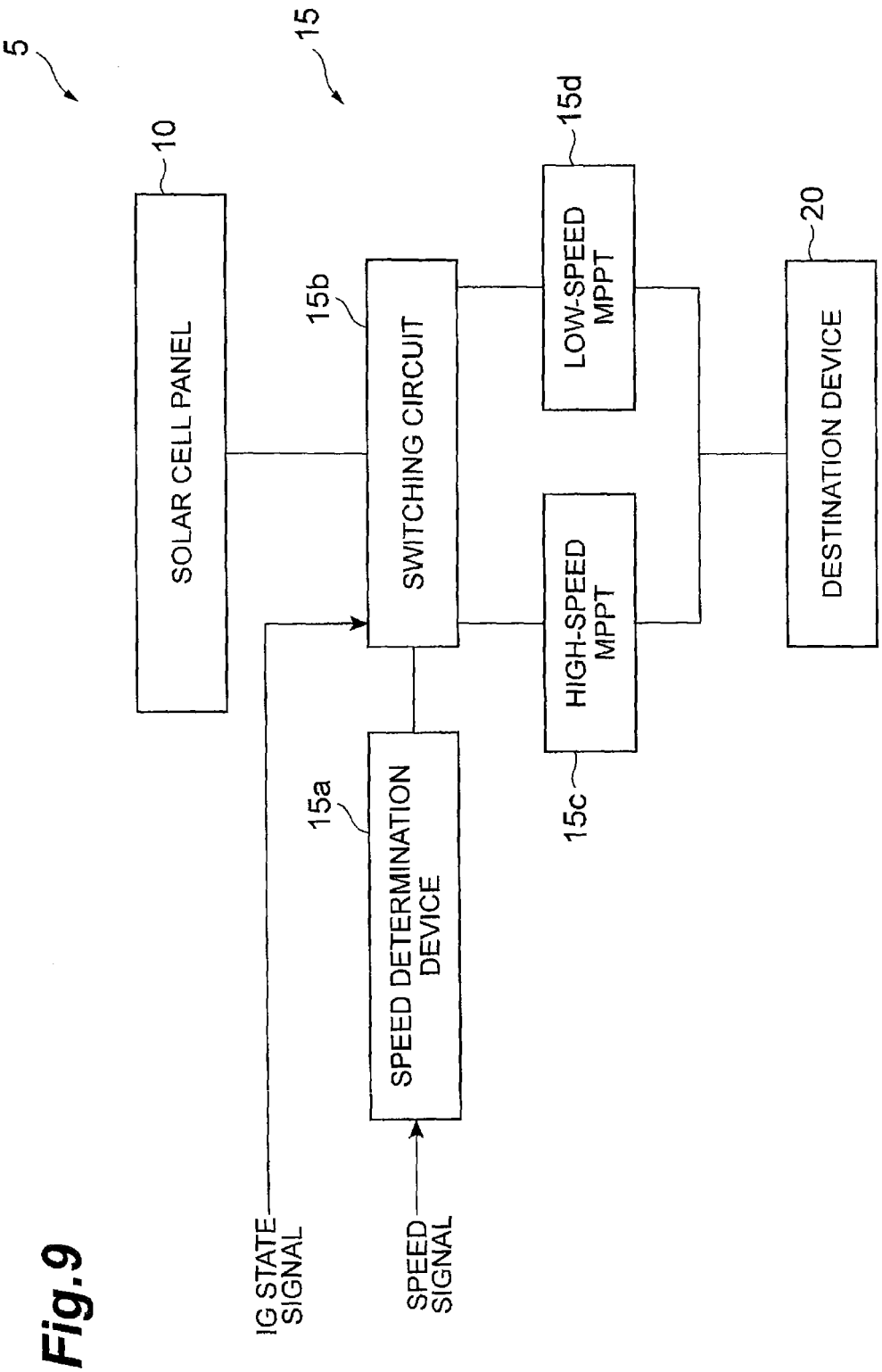
FIG. 9 is a constitutional view of a solar cell system according to a fifth embodiment.

With reference to FIG. 9, a solar cell system 5 of the fifth embodiment will be described. FIG. 9 is a constitutional view of the solar cell system according to the fifth embodiment.

In the solar cell system 5, the solar cell panel 10 is MPPT-controlled using a control device 15, and the MPPT-controlled power is output to the destination device 20. Particularly, in the control device 15, it is determined whether the vehicle is travelling, remains parked or stationary (including the vehicle travelling at a very low speed) on the basis of the state of the IG switch and the speed of the vehicle, and in a case in which the vehicle is travelling, the MPPT control is performed at a high speed, and in a case in which the vehicle remains parked or stationary, the MPPT control is performed at a low speed.

The control device 15 includes a speed determination device 15a, a switching circuit 15b, a high-speed MPPT 15c, and a low-speed MPPT 15d. The solar cell panel 10 and the destination device 20 are connected to the control device 15. In the fifth embodiment, the speed determination device 15a and the switching circuit 15b correspond to the determination unit described in the claims, the switching circuit 15b corresponds to the switching unit described in the claims, and the high-speed MPPT 15c and the low-speed MPPT 15d correspond to the plurality of MPPTs having different control cycles described in the claims. Since the high-speed MPPT 15c and the low-speed MPPT 15d are the same as the high-speed MPPT 11b and the low-speed MPPT 11c according to the first embodiment, description thereof will not be repeated.

The speed determination device 15a is an electric circuit for determining whether the vehicle is travelling or remains stationary on the basis of the speed of the vehicle only when the IG switch is in the ON state. A speed signal is input to the speed determination device 15a, and the switching circuit 15b is connected to the speed determination device. In a case in which the IG state signal indicates the ON state, in the speed determination device 15a, it is determined whether or not the speed indicated using the speed signal is equal to or more than 10 km/h, and in a case in which the speed is determined to be equal to or more than 10 km/h, the vehicle is determined to be travelling, and in a case in which the speed is determined to be less than 10 km/h, the vehicle is determined to remain stationary (including the vehicle travelling at a very low speed), and determination result signals indicating the determination results (the vehicle is travelling/remains stationary) are output to the switching circuit 15b. On the other hand, in a case in which the IG state signal indicates the OFF state, the vehicle stays parked, it is unnecessary to determine whether or not the vehicle is travelling on the basis of the speed, and thus the speed determination device 15a is not operated (speed determination is prohibited). Whether the IG state signal is the ON state or the OFF state may be determined in the speed determination device 15a by inputting the IG state signal to the speed determination device 15a, or may be determined by inputting the determination result of the IG state signal in the switching circuit 15b to the speed determination device 15a.

The switching circuit 15b is an electric circuit for switching between the high-speed MPPT 15c and the low-speed MPPT 15*d* on the basis of the state of the IG switch and the determination results (the vehicle is travelling/remains stationary) by the speed determination device 15*a*. The IG state signal and a determination result signal output from the speed determination device 15*a* are input to the switching circuit 15*b*, and the high-speed MPPT 15*c* and the low-speed MPPT 15*d* are connected to the switching circuit. In the switching circuit 15*b*, it is determined whether the IG state signal is the ON state or the OFF state on the basis of the IG state signals. In a case in which the IG state signal is determined to be the OFF state (in a case in which the vehicle is determined to remain parked), in the switching circuit 15*b*, the low-speed MPPT 15*d* is operated. On the other hand, in a case in which the IG state signal is determined to be the ON state, in the switching circuit 15*b*, it is determined whether the vehicle is travelling or remains stationary on the basis of the determination result signals. Then, in the switching circuit 15*b*, in a case in which the vehicle is determined to be travelling, the high-speed MPPT 15*c* is operated, and in a case in which the vehicle is determined to remain stationary, the low-speed MPPT 15*d* is operated.

Figure 10:
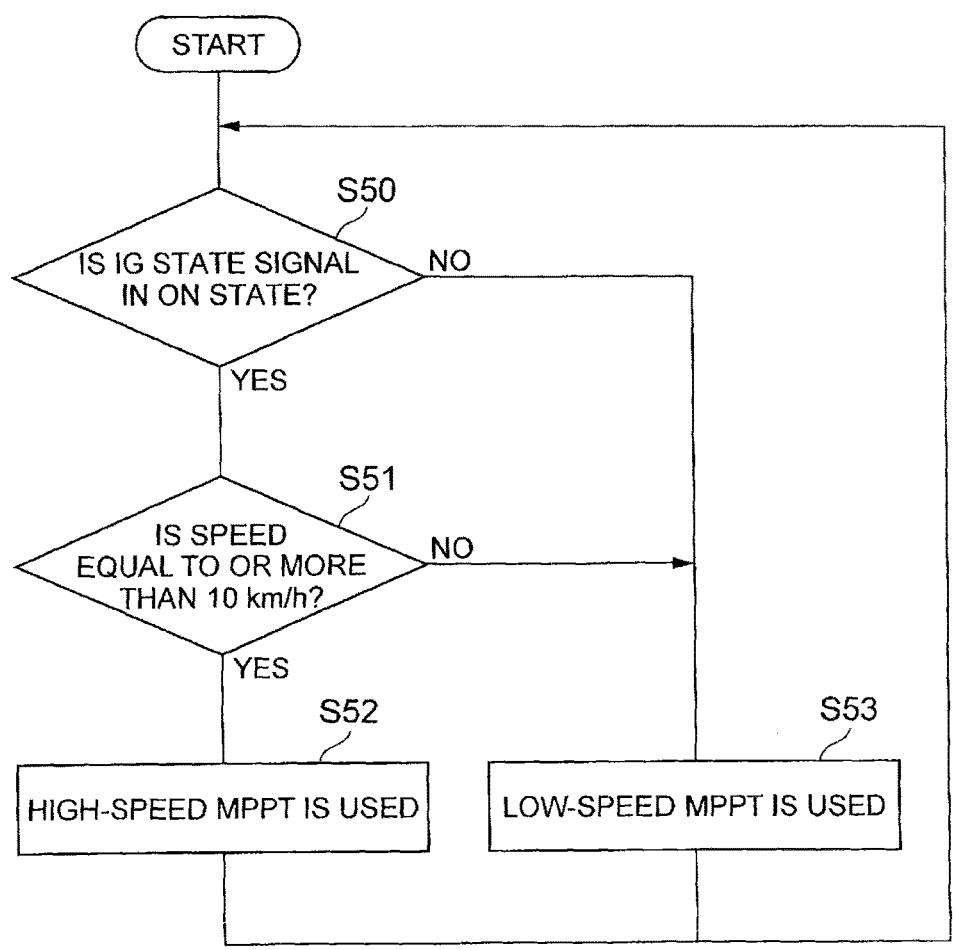
FIG. 10 is a control flowchart according to the fifth embodiment.

The operation of the solar cell system 5 having the above-described constitution will be described using the flowchart of FIG. 10. FIG. 10 is a control flowchart according to the fifth embodiment.

In the switching circuit 15*b*, it is determined whether or not the IG state signal is the ON state (S50). In a case in which the IG state signal is determined to be the ON state in S50, in the speed determination device 15*a*, it is determined whether or not the speed signal is equal to or more than 10 km/h (S51). In a case in which the speed signal is determined to be equal to or more than 10 km/h in S51, in the speed determination device 15*a*, the vehicle is determined to be travelling, and a determination result signal indicating the vehicle travelling is output to the switching circuit 15*b*. In the switching circuit 15*b*, on the basis of the determination result signal indicating the vehicle travelling, the high-speed MPPT 15*c* is operated in order to use the high-speed MPPT 15*c* (S52). In the high-speed MPPT 15*c*, the same operation as the operation of the high-speed MPPT 11*b* according to the first embodiment is performed. On the other hand, in a case in which the speed signal is less than 10 km/h in S51, in the speed determination device 15*a*, the vehicle is determined to be stopped, and a determination result signal indicating the vehicle remaining stopped is output to the switching circuit 15*b*. In a case in which the IG state signal is determined to be the OFF state in S50 (in a case in which the vehicle is determined to remain parked) or the determination result signal indicates the vehicle remaining stopped, in the switching circuit 15*b*, the low-speed MPPT 15*d* is operated in order to use the low-speed MPPT 15*d* (S53). In the low-speed MPPT 15*d*, the same operation as the operation of the low-speed MPPT 11*c* according to the first embodiment is performed. The power that is MPPT-controlled every control cycle described above is output to the destination device 20. When the MPPT control is finished in S52 or S53, the process returns to the determination of S50.

According to the control device 15, it is determined whether the vehicle is travelling, remains parked or stationary on the basis of the state of the IG switch and the speed of the vehicle, and in a case in which the vehicle is travelling, the control cycle of the MPPT control is set to be shorter than the control cycle when the vehicle remains parked or stationary, whereby it is possible to set the control cycle of the MPPT control to be short only when necessary. As a result, the power consumption is suppressed, and the MPPT control that copes with the changes in the insolation conditions in vehicles is enabled. Particularly, in the control device 15, a determination is made using the state of the IG switch and the speed of the vehicle, and thus it is possible to distinctively determine whether the vehicle remains parked or stationary. As a result, in the control device 15, in a case in which the vehicle stays parked, the speed determination (speed monitoring) can be prohibited, and it is possible to further reduce the power consumption.

Figure 11:
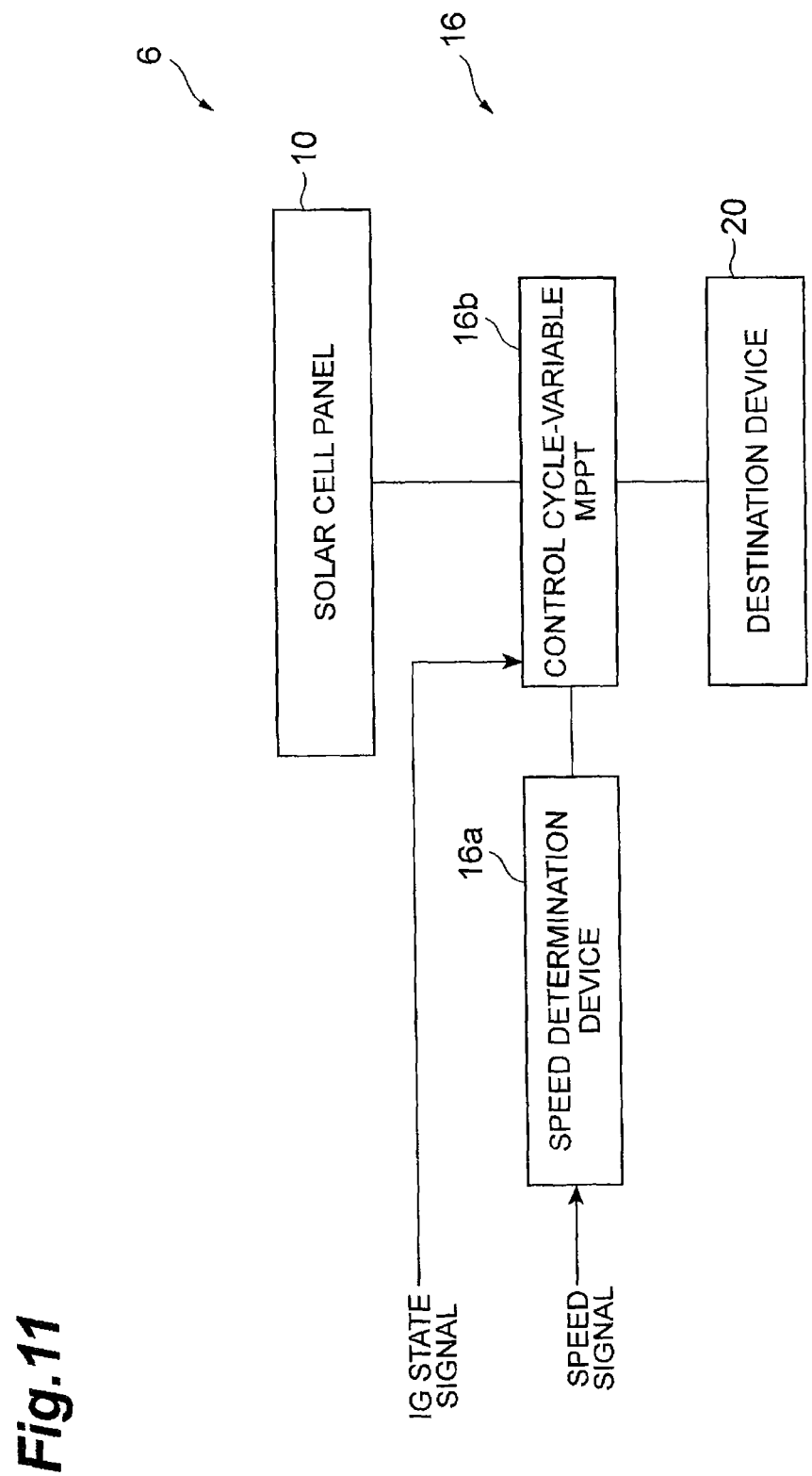
FIG. 11 is a constitutional view of a solar cell system according to a sixth embodiment.

With reference to FIG. 11, a solar cell system 6 of the sixth embodiment will be described. FIG. 11 is a constitutional view of the solar cell system according to the sixth embodiment.

When the solar cell system 6 is compared with the solar cell system 5 according to the fifth embodiment, a difference lies in the fact that the MPPT is constituted of one unit. Therefore, a control device 16 is configured to have a speed determination device 16*a* and a control cycle-variable MPPT 16*b*. The solar cell panel 10 and the destination device 20 are connected to the control device 16. In the sixth embodiment, processing in the speed determination device 16*a* and the control cycle-variable MPPT 16*b* corresponds to the determination unit described in the claims, processing in the control cycle-variable MPPT 16*b* corresponds to the switching unit described in the claims, and an electric circuit in the control cycle-variable MPPT 16*b* corresponds to an MPPT having an alterable control cycle described in the claims. Since the speed determination device 16*a* is the same as the speed determination device 15*a* according to the fifth embodiment, description thereof will not be repeated.

The control cycle-variable MPPT 16*b* is configured to have a processing unit that switches the control cycle of the MPPT on the basis of the state of the IG switch and the determination results (the vehicle is travelling or remains stationary) by the speed determination device 16*a* and an electric circuit that performs the MPPT control with variable control cycles. The processing unit is configured to have a microcomputer and the like into which a predetermined program is incorporated. An IG state signal and a determination result signal output from the speed determination device 16*a* are input to the processing unit, and the electric circuit that performs the MPPT control is connected to the processing unit. In the processing unit, it is determined whether the IG state signal is the ON state or the OFF state. In a case in which the IG state signal is determined to be the OFF state (in a case in which the vehicle is determined to stay parked), in the processing unit, the control cycle of the MPPT control circuit is switched to the low-speed control cycle. In a case in which the IG state signal is determined to be the ON state, in the processing unit, it is determined whether the vehicle is travelling or remains stationary on the basis of the determination result signals. Then, in the processing unit, in a case in which the vehicle is determined to be travelling, the control cycle of the MPPT control circuit is switched to the high-speed control cycle, and in a case in which the vehicle is determined to remain stationary, the control cycle of the MPPT control circuit is switched to the low-speed control cycle. The MPPT control circuit is the same circuit as the MPPT control circuit in the control cycle-variable MPPT 12*a* according to the second embodiment.

Figure 12:
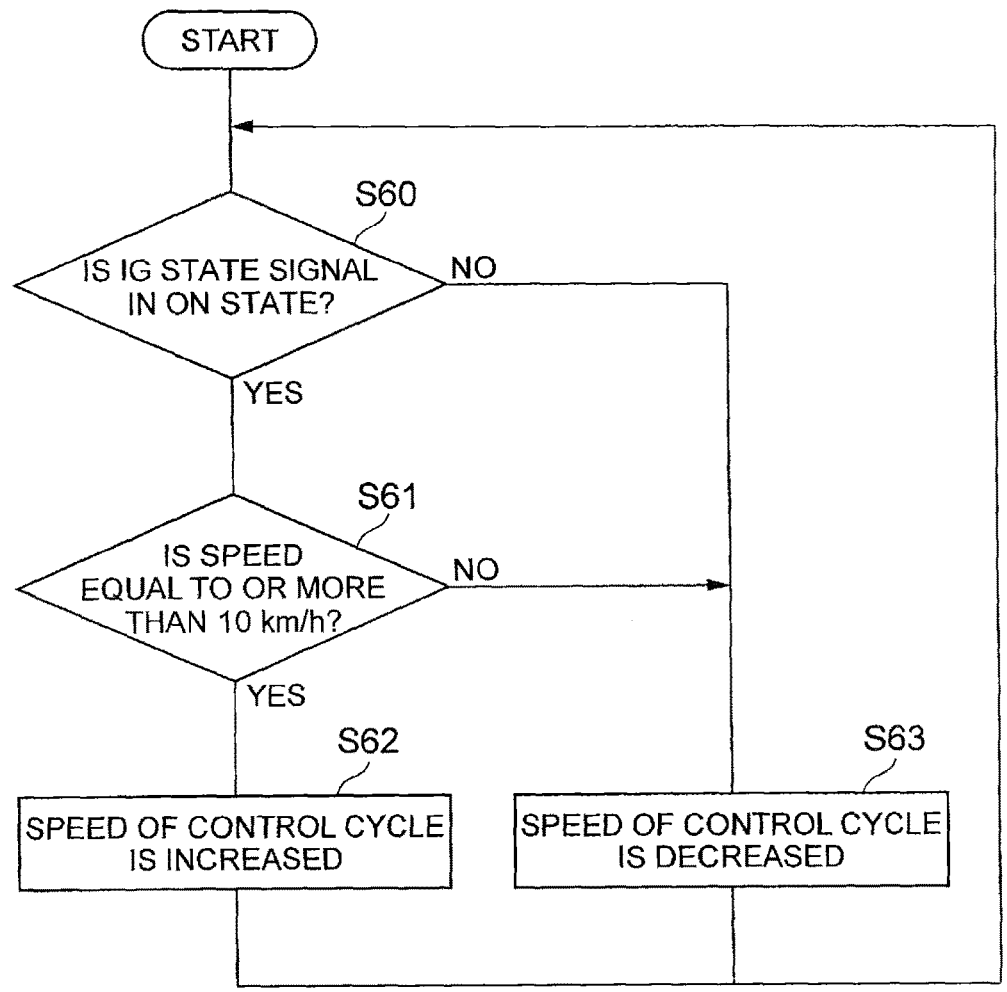
FIG. 12 is a control flowchart according to the sixth embodiment.

The operation of the solar cell system 6 having the above-described constitution will be described using the flowchart of FIG. 12. FIG. 12 is a control flowchart according to the sixth embodiment.

In the control cycle-variable MPPT 16*b*, it is determined whether or not the IG state signal is the ON state (S60). In a case in which the IG state signal is determined to be the ON state in S60, in the speed determination device 16a, it is determined whether or not the speed signal is equal to or more than 10 km/h (S61). In a case in which the speed signal is determined to be equal to or more than 10 km/h in S61, in the speed determination device 16a, the vehicle is determined to be travelling, and a determination result signal indicating the vehicle travelling is output to the control cycle-variable MPPT 16b. In the control cycle-variable MPPT 16b, on the basis of the determination result signal indicating the vehicle travelling, the control cycle is set to be short in order to speed up the control cycle of the MPPT control circuit (S62). In the MPPT control circuit in the control cycle-variable MPPT 16b, the same operation as the operation of the MPPT control circuit in the control cycle-variable MPPT 12a according to the second embodiment is performed with short control cycles. On the other hand, in a case in which the speed signal is less than 10 km/h in S61, in the speed determination device 16a, the vehicle is determined to be stopped, and a determination result signal indicating the vehicle remaining stopped is output to the control cycle-variable MPPT 16b. In a case in which the IG state signal is determined to be the OFF state in S60 (in a case in which the vehicle is determined to stay parked) or the determination result signal indicates the vehicle remaining stopped, in the control cycle-variable MPPT 16b, the control cycle is set to be long in order to slow down the control cycle of the MPPT control circuit (S63). In the MPPT control circuit in the control cycle-variable MPPT 16b, the same operation as the operation of the MPPT control circuit in the control cycle-variable MPPT 12a according to the second embodiment is performed with long control cycles. The power that is MPPT-controlled every control cycle described above is output to the destination device 20. When the MPPT control is finished in S62 or S63, the process returns to the determination of S60.

The control device 16 has the same effects as the control device 15 according to the fifth embodiment, and also has the following effect. According to the control device 16, the MPPT is configured to have one unit of the control cycle-variable MPPT 16b, and thus it is possible to reduce the mounting space.

Figure 13:
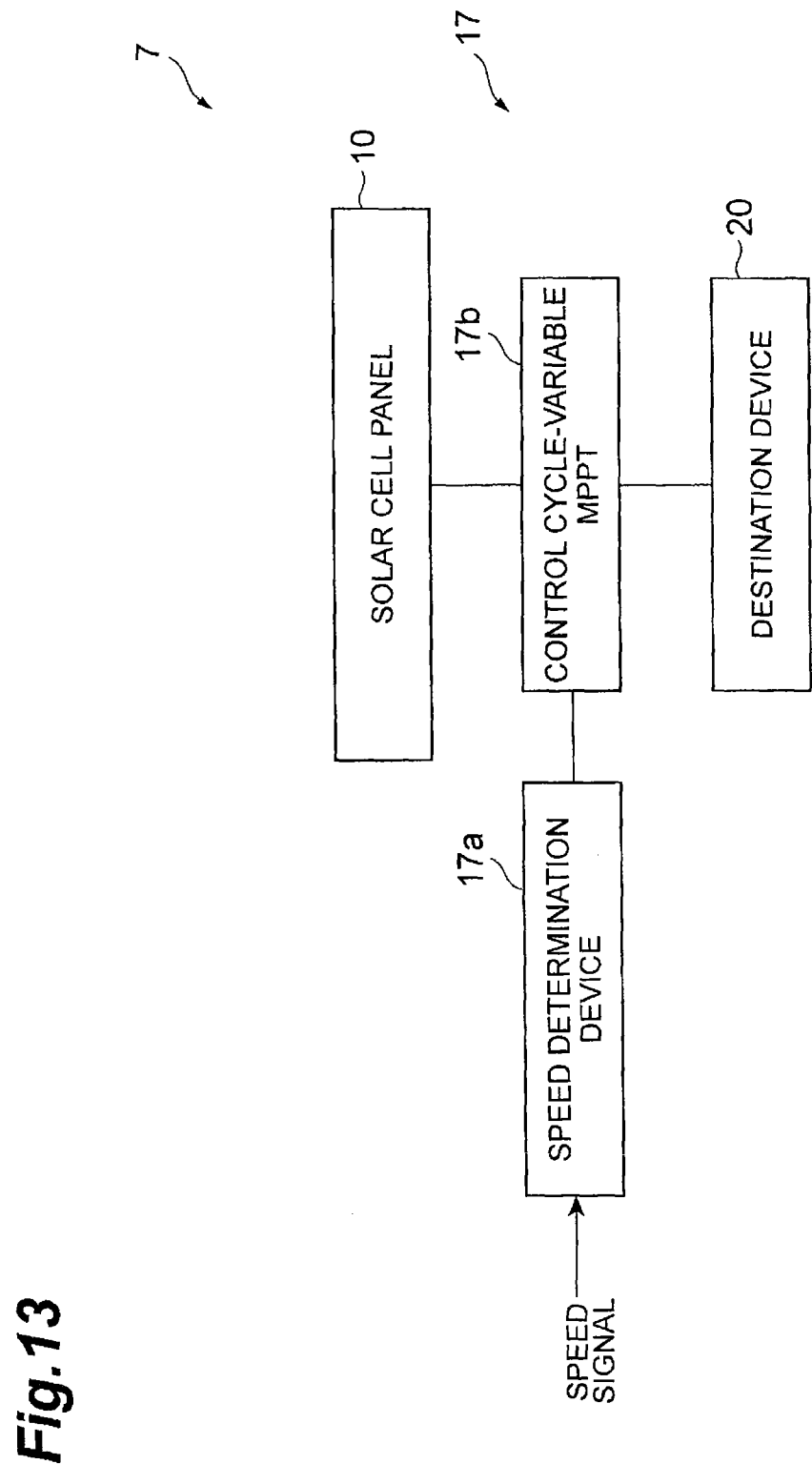
FIG. 13 is a constitutional view of a solar cell system according to a seventh embodiment.

With reference to FIG. 13, a solar cell system 7 of the seventh embodiment will be described. FIG. 13 is a constitutional view of the solar cell system according to the seventh embodiment.

In the solar cell system 7, the solar cell panel 10 is MPPT-controlled using a control device 17, and the MPPT-controlled power is output to the destination device 20. Particularly, in the control device 17, in a case in which the vehicle is travelling, when the speed of the vehicle is equal to or more than a predetermined speed, the MPPT control is performed at a low speed, and when the speed of the vehicle is less than the predetermined speed, the MPPT control is performed at a high speed.

The control device 17 includes a speed determination device 17a and a control cycle-variable MPPT 17b. The solar cell panel 10 and the destination device 20 are connected to the control device 17. In the seventh embodiment, processing in the speed determination device 17a and the control cycle-variable MPPT 17b corresponds to the determination unit described in the claims, the processing of the control cycle-variable MPPT 17b corresponds to the switching unit described in the claims, and an electric circuit in the control cycle-variable MPPT 17b corresponds to the MPPT having an alterable control cycle described in the claims.

The speed determination device 17a is an electric circuit for determining whether the speed of the vehicle is equal to or more than a predetermined speed on the basis of the speed of the vehicle. A speed signal indicating the speed of the vehicle detected using a vehicle speed sensor (not illustrated) is input to the speed determination device 17a, and the control cycle-variable MPPT 17b is connected to the speed determination device. In the speed determination device 17a, it is determined whether or not the speed indicated using the speed signal is equal to or more than $V_1$ km/h. The speed of $V_1$ km/h is a threshold value for determining whether or not the speed reaches a speed at which the speed of the vehicle is high and thus there is a possibility that the MPPT control at a high speed becomes wasteful. The speed of $V_1$ km/h is set in advance through experiments and the like in consideration of the responsiveness of the solar cell in the solar cell panel 10, the processing capacity (processing speed) in the processing unit of the control cycle-variable MPPT 17b, individual constants of the electric circuit in the control cycle-variable MPPT 17b, and the like. In the speed determination device 17a, a determination result signal indicating the determination result of whether or not the speed is equal to or more than $V_1$ km/h is output to the control cycle-variable MPPT 17b.

In a case in which the vehicle is travelling, there are cases in which the insolation conditions rapidly change as described above, and thus it is necessary to perform the MPPT control at a high speed in order to cope with the changes. However, when the speed of the vehicle is too high, the solar cell reacts even to a short shadow that passes over the solar cell panel 10 while the vehicle is travelling (for example, the short shadow of a telegraph pole), and thus there is a possibility that, in the MPPT control after the solar cell passes through the short shadow, the optimal operation point begins to move, and thus the control becomes wasteful. For example, in a case in which the solar cell passes through the short shadow of a telegraph pole, it takes approximately several tens of microseconds for the short shadow to pass through the solar cell panel 10, but the response speed of the solar cell is an order of magnitude of several microseconds, and thus when the MPPT control reacts to a decrease in output due to the short shadow, finds an optimal operation point, performs the duty control of a DC/DC converter, and thus identifies the optimal operation point, the short shadow is not on the solar cell panel 10 any longer. Therefore, when the speed of the vehicle reaches a certain high speed, it is required to suppress the control by decreasing the speed of the MPPT control (for example, to approximately the control speed of the MPPT control of stationary solar cells), and prevent the solar cell from reacting (tracking) to such a short shadow.

The control cycle-variable MPPT 17b is configured to have a processing unit that switches the control cycle of the MPPT on the basis of the determination result (whether or not the speed is equal to or more than $V_1$ km/h) by the speed determination device 17a and an electric circuit that performs the MPPT control with variable control cycles. The processing unit is configured to have a microcomputer and the like into which a predetermined program is incorporated. A determination result signal output from the speed determination device 17a is input to the processing unit, and the electric circuit that performs the MPPT control is connected to the processing unit. In the processing unit, while the vehicle is travelling, on the basis of the determination result signals, in a case in which the speed is equal to or more than $V_1$ km/h, the control cycle of the MPPT control circuit is switched to a low-speed control cycle, and in a case in which the speed is less than $V_1$ km/h, the control cycle of the MPPT control circuit is switched to a high-speed control cycle. The low-speed control cycle may be the control cycle of the low-speed MPPT control when the vehicle remains parked or stationary in each of the above-described embodiments, or may be a long control cycle other than the control cycles of the embodiments. In addition, the high-speed control cycle may be the control cycle of the high-speed MPPT control when the vehicle is travelling in each of the above-described embodiments. The MPPT control circuit is the same circuit as the MPPT control circuit in the control cycle-variable MPPT 12*a* according to the second embodiment.

Meanwhile, in a case in which the vehicle remains parked or stationary, in the control cycle-variable MPPT 17*b*, the MPPT control is performed by switching the control cycle of the MPPT control circuit to a low-speed control cycle.

Figure 14:
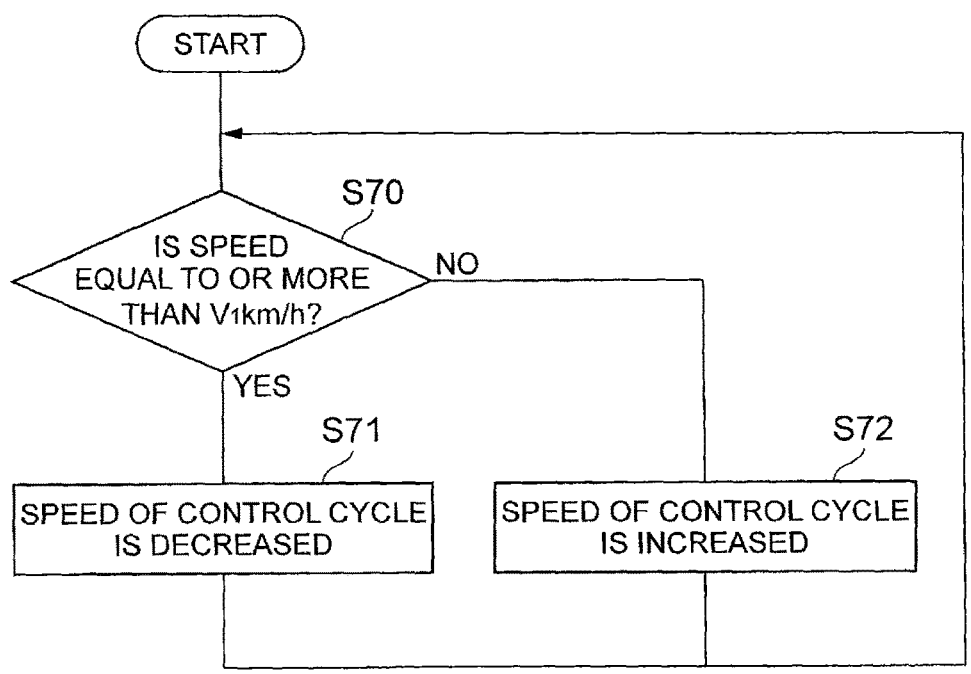
FIG. 14 is a control flowchart according to the seventh embodiment.

The operation of the solar cell system 7 having the above-described constitution will be described using the flowchart of FIG. 14. FIG. 14 is a control flowchart according to the seventh embodiment.

In the speed determination device 17*a*, it is determined whether or not the speed indicated using the speed signal is equal to or more than $V_1$ km/h (S70). In a case in which the speed is determined to be equal to or more than $V_1$ km/h in S70, in the speed determination device 17*a*, a determination result signal indicating that the speed is equal to or more than $V_1$ km/h is output to the control cycle-variable MPPT 17*b*. In the control cycle-variable MPPT 17*b*, on the basis of the determination result signal indicating the speed being equal to or more than $V_1$ km/h, the control cycle is set to be long in order to slow down the control cycle of the MPPT control circuit (S71). In the MPPT control circuit in the control cycle-variable MPPT 17*b*, the same operation as the operation of the MPPT control circuit in the control cycle-variable MPPT 12*a* according to the second embodiment is performed with long control cycles. On the other hand, in a case in which the speed is determined to be less than $V_1$ km/h in S70, in the speed determination device 17*a*, a determination result signal indicating the speed being less than $V_1$ km/h is output to the control cycle-variable MPPT 17*b*. In the control cycle-variable MPPT 17*b*, on the basis of the determination result signal indicating the speed being less than $V_1$ km/h, the control cycle is set to be short in order to speed up the control cycle of the MPPT control circuit (S72). In the MPPT control circuit in the control cycle-variable MPPT 17*b*, the same operation as the operation of the MPPT control circuit in the control cycle-variable MPPT 12*a* according to the second embodiment is performed with short control cycles. The power that is MPPT-controlled every control cycle described above is output to the destination device 20. When the MPPT control is finished in S71 or S72, the process returns to the determination of S70.

According to the control device 17, it is determined whether or not the speed of the vehicle is equal to or more than $V_1$ km/h, and in a case in which the speed is equal to or more than $V_1$ km/h, the control cycle of the MPPT control is set to be longer than the control cycle when the speed is less than $V_1$ km/h, whereby it is possible to set the control cycle of the MPPT control to be long when the speed is high in which there is a high possibility that the high-speed MPPT control becomes wasteful. As a result, the power consumption is suppressed, and the MPPT control that copes with the changes in the insolation conditions in vehicles is enabled. Therefore, when the speed of the vehicle is high, it is possible to suppress the tracking of a short shadow through the high-speed MPPT control, and suppress the wasteful high-speed MPPT control. In addition, it is possible to extend a period of time in which the low-speed MPPT control is used, and further reduce the power consumption.

Figure 15:
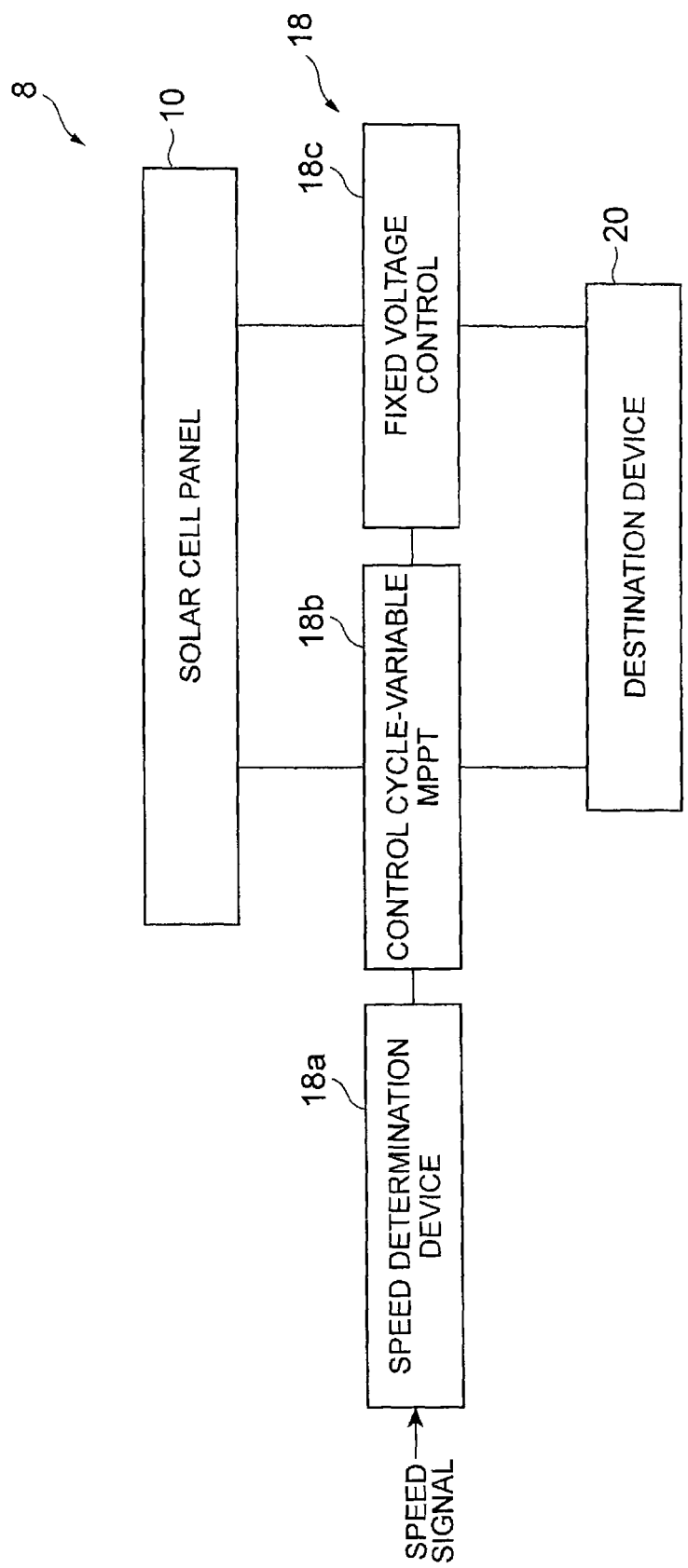
FIG. 15 is a constitutional view of a solar cell system according to an eighth embodiment.

With reference to FIG. 15, a solar cell system 8 according to the eighth embodiment will be described. FIG. 15 is a constitutional view of the solar cell system according to the eighth embodiment.

In the solar cell system 8, the solar cell panel 10 is MPPT-controlled or fixed voltage-controlled using a control device 18, and the MPPT-controlled or fixed voltage-controlled power is output to the destination device 20. Particularly, in the control device 18, in a case in which the vehicle is travelling, when the speed of the vehicle is equal to or more than a predetermined speed, fixed voltage control is performed, and when the speed is less than the predetermined speed, the MPPT control is performed at a high speed. When the speed of the vehicle reaches a certain high speed, in the seventh embodiment, the wasteful high-speed MPPT control is prevented by decreasing the speed of the MPPT control. In the eighth embodiment, instead of the low-speed MPPT control, the control is suppressed by performing the fixed voltage control.

The control device 18 includes a speed determination device 18*a*, a control cycle-variable MPPT 18*b*, and a fixed voltage control 18*c*. The solar cell panel 10 and the destination device 20 are connected to the control device 18. In the eighth embodiment, processing in the speed determination device 18*a*, the control cycle-variable MPPT 18*b*, and the fixed voltage control 18*c* corresponds to the determination unit described in the claims, processing in the control cycle-variable MPPT 18*b* corresponds to the switching unit described in the claims, and an electric circuit in the control cycle-variable MPPT 18*b* corresponds to an MPPT having an alterable control cycle described in the claims.

The speed determination device 18*a* is the same speed determination device as the speed determination device 17*a* according to the seventh embodiment. Particularly, the processing unit of the control cycle-variable MPPT 18*b* and the fixed voltage control 18*c* are connected to the speed determination device 18*a*. In the speed determination device 18*a*, it is determined whether or not the speed indicated using the speed signal is equal to or more than $V_1$ km/h, and a determination result signal indicating the determination result of whether or not the speed is equal to or more than $V_1$ km/h is output to the processing unit.

The control cycle-variable MPPT 18*b* is configured to have a processing unit that switches the control cycle of the MPPT and performs/stops the MPPT control on the basis of the determination result (whether or not the speed is equal to or more than $V_1$ km/h) by the speed determination device 18*a*, and an electric circuit that performs the MPPT control with variable control cycles. The processing unit is integrally constituted with a processing unit of the fixed voltage control 18*c*. The processing unit will be described below. The MPPT control circuit is the same circuit as the MPPT control circuit in the control cycle-variable MPPT 12*a* according to the second embodiment.

The fixed voltage control 18*c* is configured to have a processing unit that performs/stops the fixed voltage control on the basis of the determination result (whether or not the speed is equal to or more than $V_1$ km/h) by the speed determination device 18*a* and an electric circuit that performs the fixed voltage control. The processing unit is integrally constituted with the processing unit of the control cycle-variable MPPT 18*b*. The processing unit will be described below. In the fixed voltage control circuit, feedback control is performed using the maximum output voltage in the current-voltage characteristics of the solar cell in the solar cell panel 10 as target values every control cycle. Through the above-described control, every control cycle, the voltage output from the solar cell panel 10 serves as the maximum output voltage, and the maximum output power of the solar cell in the solar cell panel 10 is output. The maximum output power is set in advance on the basis of the current-voltage characteristics of the solar cell in the solar cell panel 10. The control cycle may be the control cycle of the low-speed MPPT control when the vehicle remains parked or stationary in each of the above-described embodiments, or may be a long control cycle other than the control cycles of the embodiments.

The processing unit is configured to have a microcomputer and the like into which a predetermined program is incorporated. A determination result signal output from the speed determination device 18a is input to the processing unit, and the MPPT control circuit in the control cycle-variable MPPT 18b and the fixed voltage control circuit in the fixed voltage control 18c are connected to the processing unit. In the processing unit, while the vehicle is travelling, on the basis of the determination result signals, in a case in which the speed is equal to or more than $V_1$ km/h, the MPPT control in the MPPT control circuit is stopped, and the fixed voltage control in the fixed voltage control circuit is performed, and in a case in which the speed is less than $V_1$ km/h, the control cycle of the MPPT control circuit is switched to a high-speed control cycle, and thus the MPPT control in the MPPT control circuit is performed, and the fixed voltage control in the fixed voltage control circuit is stopped. The high-speed control cycle is the control cycle of the high-speed MPPT control performed while the vehicle is travelling in each of the above-described embodiments.

Meanwhile, in a case in which the vehicle remains parked or stationary, the MPPT control may be performed by switching the control cycle of the MPPT control circuit to a low-speed control cycle in the control cycle-variable MPPT 18b, or the fixed voltage control may be carried out in the fixed voltage control 18c.

Figure 16:
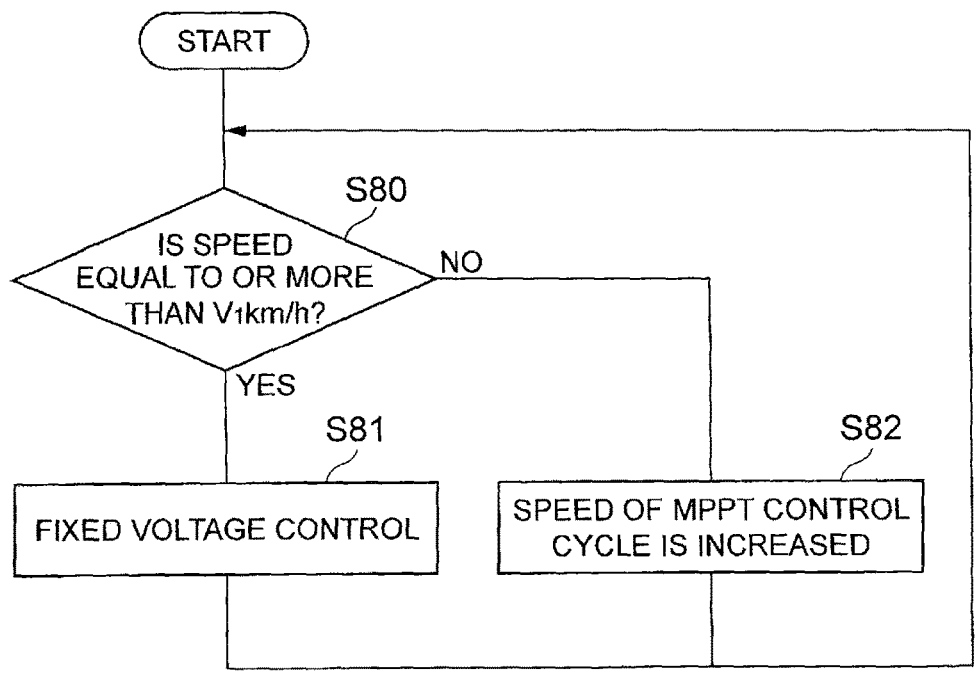
FIG. 16 is a control flowchart according to the eighth embodiment.

The operation of the solar cell system 8 having the above-described constitution will be described using the flowchart of FIG. 16. FIG. 16 is a control flowchart according to the eighth embodiment.

In the speed determination device 18a, it is determined whether or not the speed indicated using the speed signal is equal to or more than $V_1$ km/h (S80). In a case in which the speed is determined to be equal to or more than $V_1$ km/h in S80, in the speed determination device 18a, a determination result signal indicating that the speed is equal to or more than $V_1$ km/h is output to the processing unit. In the processing unit, on the basis of the determination result signal indicating the speed being equal to or more than $V_1$ km/h, the MPPT control in the MPPT control circuit is stopped. In addition, in the processing unit, the fixed voltage control in the fixed voltage control circuit is performed (S81). In the fixed voltage control circuit, feedback control is performed on the solar cell panel 10 with predetermined control cycles so as to obtain the maximum output voltage. On the other hand, in a case in which the speed is determined to be less than $V_1$ km/h in S80, in the speed determination device 18a, a determination result signal indicating that the speed is less than $V_1$ km/h is output to the processing unit. In the processing unit, on the basis of the determination result signal indicating the speed being less than $V_1$ km/h, the fixed voltage control in the fixed voltage control circuit is stopped. In addition, in the processing unit, on the basis of the determination result signal indicating the speed being less than $V_1$ km/h, the control cycle is set to be short in order to increase the speed of the control cycle of the MPPT control circuit (S82). In the MPPT control circuit in the control cycle-variable MPPT 18b, the same operation as the operation of the MPPT control circuit in the control cycle-variable MPPT 12a according to the second embodiment is performed with short control cycles. The power that is fixed voltage-controlled or MPPT-controlled every control cycle described above is output to the destination device 20. When the fixed voltage control in S81 or the MPPT control in S82 is finished, the process returns to the determination of S80.

According to the control device 18, it is determined whether or not the speed of the vehicle is equal to or more than $V_1$ km/h, and in a case in which the speed is equal to or more than $V_1$ km/h, the fixed voltage control is performed, whereby the fixed voltage control is performed when the speed is high in which there is a high possibility that the high-speed MPPT control becomes wasteful. As a result, the power consumption is suppressed, and the MPPT control that copes with the changes in the insolation conditions in vehicles is enabled. Therefore, when the speed of the vehicle is high, it is possible to suppress the tracking of a short shadow through the high-speed MPPT control, and suppress the wasteful high-speed MPPT control. In addition, it is possible to further reduce the power consumption through the fixed voltage control.

Figure 17:
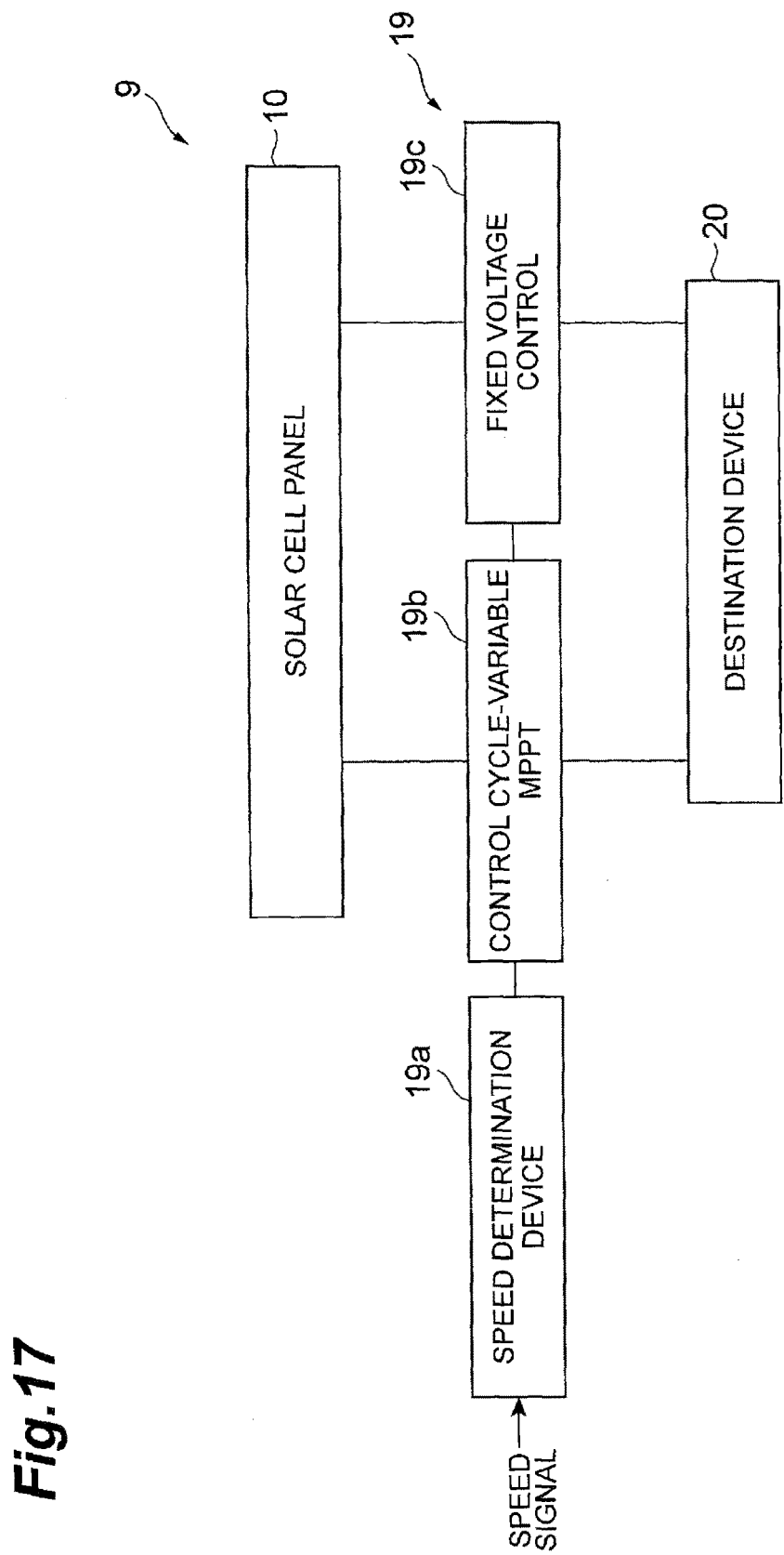
FIG. 17 is a constitutional view of a solar cell system according to a ninth embodiment.

With reference to FIG. 17, a solar cell system 9 of the ninth embodiment will be described. FIG. 17 is a constitutional view of the solar cell system according to the ninth embodiment.

In the solar cell system 9, the solar cell panel 10 is MPPT-controlled or fixed voltage-controlled using a control device 19, and the MPPT-controlled or fixed voltage-controlled power is output to the destination device 20. Particularly, in the control device 19, when the speed of the vehicle is equal to or more than a predetermined speed, fixed voltage control is performed, and when the speed is less than the predetermined speed, the MPPT control is performed with control cycles suitable for individual speed ranges.

The control device 19 includes a speed determination device 19a, a control cycle-variable MPPT 19b, and a fixed voltage control 19c. The solar cell panel 10 and the destination device 20 are connected to the control device 19. In the ninth embodiment, processing in the speed determination device 19a, the control cycle-variable MPPT 19b, and the fixed voltage control 19c corresponds to the determination unit described in the claims, processing in the control cycle-variable MPPT 19b corresponds to the switching unit described in the claims, and an electric circuit in the control cycle-variable MPPT 19b corresponds to an MPPT having an alterable control cycle described in the claims.

The speed determination device 19a is an electric circuit for determining which speed range the speed of the vehicle falls in. A speed signal indicating the speed of the vehicle detected by the vehicle speed sensor (not illustrated) is input to the speed determination device 19a, and the processing unit of the control cycle-variable MPPT 19b and the fixed voltage control 19c are connected to the speed determination device. In the speed determination device 19a, it is determined whether or not the speed indicated using the speed signal falls in any of speed ranges of $V_1$ km/h or more, $V_2$ km/h to less than $V_1$ km/h, $V_3$ km/h to less than $V_2$ km/h, . . . , less than $V_n$ km/h. $V_1, V_2, V_3, \ldots, V_n$ km/h represent speeds indicating the boundaries between the respective speed ranges, and have a relationship of $V_1 > V_2 > V_3 > \ldots > V_n$. The number of speed ranges (the number n of speeds indicating the boundaries between the speed ranges) is arbitrary, and may be appropriately set. The respective speeds of $V_1$, $V_2$, $V_3$, ..., $V_n$ are arbitrary, and may be appropriately set. For example, $V_1$ is set to the same speed as $V_1$ in the seventh embodiment, $V_n$ is set to the threshold speed (for example, 10 km/h) in the third embodiment for determining whether the vehicle is travelling, remains parked or stationary, and other speeds of $V_2$, $V_3$, ..., $V_{n-1}$ are set to speeds obtained by evenly dividing the total speed range. In the speed determination device 18a, a determination result signal indicating which speed range the speed of the vehicle falls in is output to the processing unit of the control cycle-variable MPPT 19b and the fixed voltage control 19c.

As described above, when the speed of the vehicle reaches a certain high speed, the low-speed MPPT control or the fixed voltage control is performed in order to suppress the high-speed MPPT control becoming wasted. In addition, in a case in which the vehicle remains parked or stationary, the changes of the insolation conditions are relatively modest, and thus the low-speed MPPT control is performed. At speeds between the high and low speeds, since the insolation conditions rapidly change, it is necessary to perform the MPPT control at a high speed. However, there are optimal values for the control speed (control cycle) of the MPPT control depending on the speed of the vehicle. Therefore, the total speed range is also divided into multiple speed ranges, suitable control cycles are set for the respective speed ranges, and the MPPT control is performed with the respective control cycles. The respective speed ranges and the control cycles suitable for the respective speed ranges are set in advance through the testing of actual vehicles or the like. For example, for the speed range from $V_n$ km/h to $V_1$ km/h, control cycles that shorten in a step-by-step manner are set for individual speed ranges falling in a range of $V_n$ km/h to an arbitrary speed, and control cycles that lengthen in a step-by-step manner are set for the individual speed ranges falling in a range of the arbitrary speed to $V_1$ km/h. Therefore, when the speed becomes higher than $V_n$ km/h, the control cycles of the MPPT control become shorter in a step-by-step manner, and when the speed becomes higher than the arbitrary speed, the control cycles of the MPPT control become longer in a step-by-step manner.

The control cycle-variable MPPT 19b is configured to have a processing unit that switches the control cycle of the MPPT and performs/stops the MPPT control on the basis of the determination result (which speed range the speed falls in) by the speed determination device 19a, and an electric circuit that performs the MPPT control with variable control cycles. The processing unit is integrally constituted with a processing unit of the fixed voltage control 19c. The processing unit will be described below. The MPPT control circuit is the same circuit as the MPPT control circuit in the control cycle-variable MPPT 12a according to the second embodiment.

The fixed voltage control 19c is configured to have a processing unit that performs/stops the fixed voltage control on the basis of the determination result (which speed range the speed falls in) by the speed determination device 19a and an electric circuit that performs the fixed voltage control. The processing unit is integrally constituted with the processing unit of the control cycle-variable MPPT 19b. The processing unit will be described below. The fixed voltage control circuit is the same circuit as the fixed voltage control circuit in the fixed voltage control 18c according to the eighth embodiment.

The processing unit is configured to have a microcomputer and the like into which a predetermined program is incorporated. A determination result signal output from the speed determination device 19a is input to the processing unit, and the MPPT control circuit in the control cycle-variable MPPT 19b and the fixed voltage control circuit in the fixed voltage control 19c are connected to the processing unit. In the processing unit, on the basis of the determination result signals, in a case in which the speed is equal to or more than $V_1$ km/h, the MPPT control in the MPPT control circuit is stopped, and the fixed voltage control in the fixed voltage control circuit is performed, and in a case in which the speed is less than $V_1$ km/h, the control cycle is switched to the control cycle of the MPPT control circuit which is set in accordance with the speed range, the MPPT control in the MPPT control circuit is performed, and the fixed voltage control in the fixed voltage control circuit is stopped.

Figure 18:
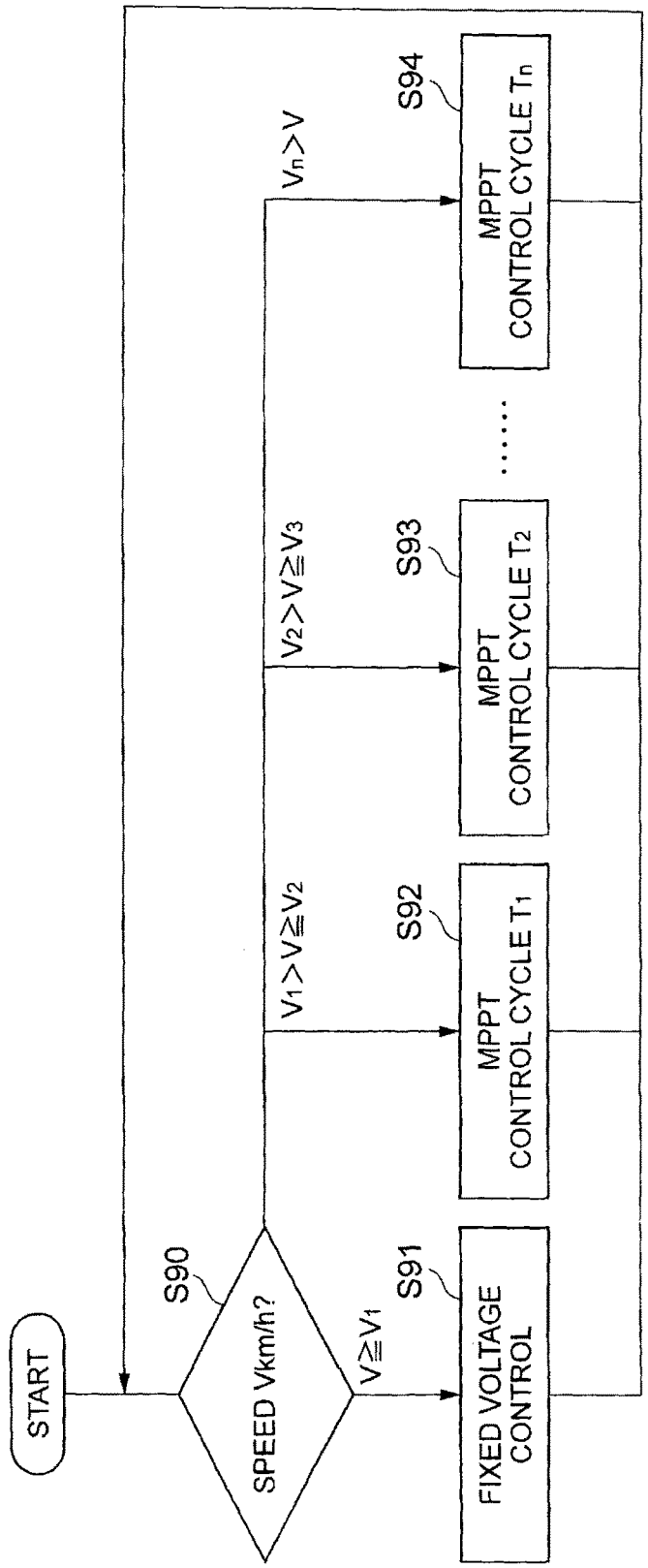
FIG. 18 is a control flowchart according to the ninth embodiment.

The operation of the solar cell system 9 having the above-described constitution will be described using the flowchart of FIG. 18. FIG. 18 is a control flowchart according to the ninth embodiment.

In the speed determination device 19a, it is determined which speed range the speed V indicated using the speed signal falls in (S90). In a case in which the speed is determined to fall in a speed range of $V_1$ km/h or more in S90, in the speed determination device 19a, a determination result signal indicating that the speed falls in the speed range of $V_1$ km/h or more is output to the processing unit. In the processing unit, on the basis of the determination result signal indicating the speed falling in the range of $V_1$ km/h or more, the MPPT control in the MPPT control circuit is stopped. In addition, in the processing unit, on the basis of the determination result signal indicating the speed falling in the range of $V_1$ km/h or more, the fixed voltage control in the fixed voltage control circuit is performed (S91). In the fixed voltage control circuit, the same operation as the operation of the fixed voltage control circuit in the fixed voltage control 18c according to the eighth embodiment is performed. In a case in which the speed is determined to fall in a speed range of $V_2$ km/h to less than $V_1$ km/h in S90, in the speed determination device 19a, a determination result signal indicating that the speed falls in the speed range of $V_2$ km/h to less than $V_1$ km/h is output to the processing unit. In the processing unit, on the basis of the determination result signal indicating the speed falling in the range of $V_2$ km/h to less than $V_1$ km/h, the fixed voltage control in the fixed voltage control circuit is stopped. In addition, in the processing unit, on the basis of the determination result signal indicating the speed falling in the range of $V_2$ km/h to less than $V_1$ km/h, the control cycle of the MPPT control circuit is set to a control cycle $T_1$ set with respect to the speed range of $V_2$ km/h to less than $V_1$ km/h (S92). In the MPPT control circuit, the same operation as the operation of the MPPT control circuit in the control cycle-variable MPPT 12a according to the second embodiment is performed at the control cycle $T_1$. In a case in which the speed is determined to fall in a speed range of $V_3$ km/h to less than $V_2$ km/h in S90, in the speed determination device 19a, a determination result signal indicating that the speed falls in the speed range of $V_3$ km/h to less than $V_2$ km/h is output to the processing unit. In the processing unit, on the basis of the determination result signal indicating the speed falling in the range of $V_3$ km/h to less than $V_2$ km/h, the fixed voltage control in the fixed voltage control circuit is stopped. In addition, in the processing unit, on the basis of the determination result signal indicating the speed falling in the range of $V_3$ km/h to less than $V_2$ km/h, the control cycle of the MPPT control circuit is set to a control cycle $T_2$ set with respect to the speed range of $V_3$ km/h to less than $V_2$ km/h (S93). In the MPPT control circuit, the same operation as the operation of the MPPT control circuit in the control cycle-variable MPPT 12a according to the second embodiment is performed at the control cycle $T_2$. In a case in which the speed is determined to fall in other speed ranges in S90 as well, the operation is performed in the same manner as described above in accordance with the respective speed ranges. In a case in which the speed is determined to fall in a speed range of less than $V_n$ km/h in S90, in the speed determination device 19a, a determination result signal indicating that the speed falls in the speed range of less than $V_n$ km/h is output to the processing unit. In the processing unit, on the basis of the determination result signal indicating the speed falling in the range of less than $V_n$ km/h, the fixed voltage control in the fixed voltage control circuit is stopped. In addition, in the processing unit, on the basis of the determination result signal indicating the speed falling in the range of less than $V_n$ km/h, the control cycle of the MPPT control circuit is set to a control cycle $T_n$ set with respect to the speed range of less than $V_n$ km/h (S94). In the MPPT control circuit, the same operation as the operation of the MPPT control circuit in the control cycle-variable MPPT 12a according to the second embodiment is performed at the control cycle $T_n$. The power that is fixed voltage-controlled or MPPT-controlled every control cycle described above is output to the destination device 20. When the fixed voltage control in S91 or the MPPT control in S92 to S94 is finished, the process returns to the determination of S90.

According to the control device 19, when it is determined which speed range the speed of the vehicle falls in, and in a case in which the speed falls in a speed range of $V_1$ km/h or more, the fixed voltage control is performed, whereby the same effects as the eighth embodiment can be obtained. Furthermore, according to the control device 19, when it is determined which speed range the speed of the vehicle falls in, and in a case in which the speed falls in any speed range of less than $V_1$ km/h, the MPPT control is performed with control cycles suitable for the respective speed ranges, whereby the power consumption is suppressed, and the optimal MPPT control that copes with the changes in the insolation conditions in vehicles is enabled. As a result, it is possible to most efficiently extract electric energy in accordance with the speed of the vehicle at that time, and the power consumption can also be extremely reduced. Since the control cycle-variable MPPT 19b capable of arbitrarily altering the control cycle is used, even when the MPPT control is performed in three or more kinds of different control cycles, the mounting space does not increase.

Thus far, the embodiments according to the present invention have been described, but the present invention is not limited to the embodiments, and can be carried out in various forms.

For example, in the present embodiment, the state of the IG switch or the speed is determined each time the optimal operation point is detected once using the high-speed or low-speed MPPT control, but the state of the IG switch or the speed may be determined each time the optimal operation point is detected an arbitrary number of times such as twice or more using the high-speed or low-speed MPPT control. Particularly, the state of the IG switch may be determined using the switching timing of the IG switch between the ON state and the OFF state only. That is, when the IG switch is switched to the ON state, the high-speed MPPT control (short control cycle) is fixed until the following OFF state (there is no determination made in the middle), and when the IG switch is switched to an OFF state, the low-speed MPPT control (long control cycle) is fixed until the following ON state. However, in the cases of the fifth and sixth embodiments, the speed is determined when the IG switch is in the ON state.

In addition, in the present embodiment, the determination threshold for determining whether the vehicle is travelling, remains parked or stationary is set to 10 km/h, but other speeds may be used as the determination threshold.

In addition, in the present embodiment, whether the vehicle is travelling, remains parked or stationary is determined using the state of the IG switch or the speed of the vehicle, but may be determined using other parameters. In addition, in the present embodiment, even in a case in which the IG switch is in the OFF state (in a case in which the vehicle stays parked), the power is extracted by performing the MPPT control; however, it is also possible to turn the MPPT control off in a case in which the IG switch is in the OFF state, make a determination only in a case in which the IG switch is in a ON state (in a case in which the vehicle is travelling or remains stationary (including the vehicle travelling at a low speed)), and perform the MPPT control depending on the determination, thereby extracting power.

In addition, in the present embodiment, the control cycle of the MPPT is changed in order to change the processing speed of the MPPT, but the clock of a microcomputer (ECU) may be changed (dropped). Particularly, in the case of the ninth embodiment, the clock is changed in a step-by-step manner in accordance with the respective speed ranges. Through the above-described constitution, the power consumption of the ECU can be reduced.

In addition, in the seventh to ninth embodiments, the MPPT has different control cycles that are switched therebetween using the control cycle-variable MPPT; however, as in the first, third, and fifth embodiments, the MPPTs having different control cycles may be switched using multiple MPPTs having different control cycles and a switching circuit that switches the multiple MPPTs. Particularly, in a case in which the fixed voltage control is also performed as in the eighth and ninth embodiments, switching is made between the MPPT control and the fixed voltage control using the switching circuit.

In addition, any one of the second, fourth, and sixth embodiments and any one of the seventh to ninth embodiments may be combined together. For example, in a case in which the fourth embodiment and the seventh embodiment are combined together, whether the vehicle is travelling, remains parked or stationary is determined using the information regarding whether the speed of the vehicle is 10 km/h or more, and in a case in which the vehicle remains parked or stationary, the speed of the control cycle of the MPPT control is decreased, and in a case in which the vehicle is travelling, whether or not the speed of the vehicle is determined to be equal to or more than $V_1$, when the speed is less than $V_1$, the speed of the control cycle of the MPPT control is increased, and when the speed is equal to or more than $V_1$, the speed of the control cycle of the MPPT control is decreased. In addition, in a case in which the fourth embodiment and the eighth embodiment are combined together, whether the vehicle is travelling, remains parked or stationary is determined using the information regarding whether the speed of the vehicle is 10 km/h or more, and in a case in which the vehicle remains parked or stationary, the speed of the control cycle of the MPPT control is decreased, and in a case in which the vehicle is travelling, whether or not the speed of the vehicle is determined to be equal to or more than $V_1$, when the speed is less than $V_1$, the speed of the control cycle of the MPPT control is increased, and when the speed is equal to or more than $V_1$, the fixed voltage control is performed.

In addition, in the ninth embodiment, in a case in which the speed of the vehicle is equal to or more than $V_1$ km/h, the fixed voltage control is performed, and in a case in which the speed is less than $V_1$ km/h, the MPPT control is performed with control cycles suitable for the respective speed ranges; however, it is also possible to, without the fixed voltage control, perform the MPPT control with long control cycles even in a case in which the speed is equal to or more than $V_1$ km/h, and perform the MPPT control with control cycles suitable for the respective speed ranges in the entire speed range.

INDUSTRIAL APPLICABILITY

The present invention can be used in a control device for an in-vehicle solar cell which performs at least the MPPT control of the output of a solar cell mounted in a vehicle.

REFERENCE SIGNS LIST 1, 2, 3, 4, 5, 6, 7, 8, 9 . . . SOLAR CELL SYSTEM, 10 . . . SOLAR CELL PANEL, 11, 12, 13, 14, 15, 16, 17, 18, 19 . . . CONTROL DEVICE, 11A, 13B, 15B . . . SWITCHING CIRCUIT, 11B, 13C, 15C . . . HIGH-SPEED MPPT, 11C, 13D, 15D . . . LOW-SPEED MPPT, 12A, 14B, 16B, 17B, 18B, 19B . . . CONTROL CYCLE-VARIABLE MPPT, 13A, 14A, 15A, 16A, 17A, 18A, 19A . . . SPEED DETERMINATION DEVICE, 18C, 19C . . . FIXED VOLTAGE CONTROL, 20 . . . DESTINATION DEVICE

The invention claimed is:

1. A control device for a solar cell mounted in a vehicle, the control device comprising:
an electronic control unit (ECU) configured to:
determine whether the vehicle is in a travelling state or a stationary state;
detect a speed of the vehicle when the vehicle is in the travelling state; and
set a control cycle of a maximum power point tracking (MPPT) control for the solar cell based on the speed of the vehicle,
wherein the ECU is configured to, in the travelling state, perform the MPPT control for the solar cell when the speed of the vehicle is less than a predetermined speed, and
wherein the ECU is configured to, in the travelling state, suspend the MPPT control and perform a fixed voltage control for the solar cell when the speed of the vehicle is equal to or more than the predetermined speed.

2. The control device according to claim 1, wherein when the vehicle is determined to be in the travelling state, the ECU is configured to set the control cycle to be shorter than the control cycle when the vehicle is determined to be in the stationary state.

3. The control device according to claim 1, wherein the ECU is configured to determine whether the vehicle is in the travelling state or the stationary state on the basis of at least one of a state of an ignition switch and the speed of the vehicle.

4. The control device according to claim 3, wherein the ECU is configured to:
determine that the vehicle is in the travelling state when the ignition switch is in an ON state, and
determine that the vehicle is in the stationary state when the ignition switch is in an OFF state.

5. The control device according to claim 3, wherein the ECU is configured to:
determine that the vehicle is in the travelling state when the speed of the vehicle is equal to or more than a stationary state determination speed, and
determine that the vehicle is in the stationary state when the speed of the vehicle is less than the stationary state determination speed.

6. The control device according to claim 3, wherein the ECU is configured to:
determine that the vehicle is in the travelling state when the ignition switch is in an ON state and the speed of the vehicle is equal to or more than a stationary state determination speed, and
determine that the vehicle is in the stationary state when the ignition switch is in an OFF state or when the ignition switch is in the ON state and the speed of the vehicle is less than the stationary state determination speed.

7. The control device according to claim 6, wherein the ECU is configured to prohibit determining whether the vehicle is in the travelling state or the stationary state on the basis of the speed of the vehicle when the ignition switch is in the OFF state.

8. The control device according to claim 1, wherein the ECU includes:
a plurality of MPPTs having different control cycles; and
a switch configured to switch to any one of the plurality of MPPTs according to the determination of whether the vehicle is in the travelling state or the stationary state.

9. The control device according to claim 1, comprising:
an MPPT having an alterable control cycle; and
the ECU is configured to switch the control cycle of the MPPT according to the determination of whether the vehicle is in the travelling state or the stationary state.

* * * * *